(12) United States Patent
Ringold et al.

(10) Patent No.: US 10,711,401 B2
(45) Date of Patent: *Jul. 14, 2020

(54) HIGH EFFICIENCY WET STRENGTH RESINS FROM NEW CROSS-LINKERS

(71) Applicant: ECOLAB USA INC., St. Paul, MN (US)

(72) Inventors: Clay E. Ringold, Decatur, GA (US); Cornel Hagiopol, Lilburn, GA (US); Dexter C. Johnson, Stone Mountain, GA (US)

(73) Assignee: ECOLAB USA INC., St. Paul, MN (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/722,944

(22) Filed: Oct. 2, 2017

(65) Prior Publication Data

US 2018/0023254 A1 Jan. 25, 2018

Related U.S. Application Data

(63) Continuation of application No. 14/725,384, filed on May 29, 2015, now Pat. No. 9,777,436, which is a continuation of application No. 13/944,923, filed on Jul. 18, 2013, now Pat. No. 9,045,862.

(60) Provisional application No. 61/673,534, filed on Jul. 19, 2012.

(51) Int. Cl.
| | |
|---|---|
| *D21H 21/20* | (2006.01) |
| *D21H 23/04* | (2006.01) |
| *C08G 73/06* | (2006.01) |
| *D21H 17/52* | (2006.01) |
| *D21H 17/55* | (2006.01) |
| *D21H 17/33* | (2006.01) |
| *D21H 17/56* | (2006.01) |
| *D21H 11/04* | (2006.01) |

(52) U.S. Cl.
CPC ............ *D21H 21/20* (2013.01); *C08G 73/06* (2013.01); *D21H 11/04* (2013.01); *D21H 17/33* (2013.01); *D21H 17/52* (2013.01); *D21H 17/55* (2013.01); *D21H 17/56* (2013.01); *D21H 23/04* (2013.01)

(58) Field of Classification Search
None
See application file for complete search history.

(56) References Cited

U.S. PATENT DOCUMENTS

| | | | |
|---|---|---|---|
| 4,478,938 A | 10/1984 | Freedman | |
| 4,536,552 A | 8/1985 | Killat et al. | |
| 5,152,901 A | 10/1992 | Hodgdon | |
| 5,393,338 A | 2/1995 | Pudney et al. | |
| 5,434,222 A | 7/1995 | Reiners et al. | |
| 5,536,370 A | 7/1996 | Scherr et al. | |
| 5,567,798 A | 10/1996 | Dulany et al. | |
| 5,585,456 A | 12/1996 | Dulany et al. | |
| 5,912,306 A | 6/1999 | Pudney et al. | |
| 6,908,983 B2 | 6/2005 | Maslanka | |
| 7,459,502 B2 | 12/2008 | Connor et al. | |
| 7,589,153 B2 | 9/2009 | Hagiopol et al. | |
| 7,902,141 B2 | 3/2011 | Becker et al. | |
| 7,932,349 B2 | 4/2011 | Riehle et al. | |
| 7,943,705 B2 | 5/2011 | Allen | |
| 8,999,110 B2 | 4/2015 | Hagiopol et al. | |
| 9,045,862 B2* | 6/2015 | Ringold | D21H 21/20 |
| | | | 162/164.6 |
| 9,212,453 B2 | 12/2015 | Luo et al. | |
| 9,353,483 B2 | 5/2016 | Hagiopol et al. | |
| 9,506,196 B2 | 11/2016 | Hagiopol et al. | |
| 9,834,890 B2* | 12/2017 | Hagiopol | D21H 21/20 |
| 2003/0114631 A1 | 6/2003 | Walton et al. | |
| 2005/0147580 A1 | 7/2005 | Connor et al. | |
| 2007/0054144 A1 | 3/2007 | Dopico et al. | |
| 2012/0244095 A1 | 9/2012 | Konradi et al. | |
| 2014/0020858 A1 | 1/2014 | Ringold et al. | |
| 2014/0166223 A1 | 6/2014 | Hagiopol et al. | |

FOREIGN PATENT DOCUMENTS

| | | |
|---|---|---|
| JP | 2005213400 | 8/2005 |
| JP | 2009263843 | 11/2009 |
| WO | 95/27008 | 10/1995 |
| WO | 01/36491 | 5/2001 |
| WO | 2014/099838 | 6/2014 |

OTHER PUBLICATIONS

Obokata et al, "Characterization of Polyamideamine-Epichlorohydrin (PAE) Resin: Roles of Azetidinium Groups and Molecular Mass of PAE in Wet Strength Development of Paper Prepared with PAE", J. Appl. Polymer Sci., v. 97, pp. 2249-2255, 2005. (Year: 2005).*
Extended European Search Report for EP Application No. 16804179.6 dated Jan. 16, 2019.
International Search Report and Written Opinion for International Application No. PCT/US2013/051050 dated Oct. 16, 2013.
International Search Report and Written Opinion for International Application No. PCT/US2016/034884 dated Aug. 8, 2016.

* cited by examiner

*Primary Examiner* — Dennis R Cordray
(74) *Attorney, Agent, or Firm* — Edmonds & Cmaidalka, P.C.

(57) ABSTRACT

Compositions and methods related to new wet strength resins are provided. By using functionally-symmetrical cross-linkers and mono-functional modifiers, and separating the steps of reacting a prepolymer with the cross-linkers from the reaction of intermediate cross-linked prepolymer with epichlorohydrin, new wet strength resin products are provided having improved properties.

20 Claims, No Drawings

HIGH EFFICIENCY WET STRENGTH RESINS FROM NEW CROSS-LINKERS

CROSS-REFERENCE TO RELATED APPLICATIONS

This application is a continuation of co-pending U.S. patent application Ser. No. 14/725,384, filed on May 29, 2015, which is a continuation of U.S. patent application Ser. No. 13/944,923, filed on Jul. 18, 2013, now U.S. Pat. No. 9,045,862, which claims priority to U.S. Provisional Patent Application No. 61/673,534, filed on Jul. 19, 2012, all of which are incorporated by reference herein.

FIELD OF THE INVENTION

The invention relates to paper strengthening agents, particularly wet strengthening agents.

BACKGROUND OF THE INVENTION

Paper is sheet material containing interconnected small, discrete fibers. The fibers are usually formed into a sheet on a fine screen from a dilute water suspension or slurry. Paper typically is made from cellulose fibers, although occasionally synthetic fibers are used.

Paper products made from untreated cellulose fibers lose their strength rapidly when they become wet, i.e., they have very little "wet strength". Wet strength of ordinary paper is only about 5% of its dry strength. The wet strength of paper is defined as the resistance of the paper to rupture or disintegration when it is wetted with water. See U.S. Pat. No. 5,585,456. To overcome this disadvantage, various methods of treating paper products have been employed.

Wet strength resins applied to paper are either of the "permanent" or "temporary" type, which are defined by how long the paper retains its wet strength after immersion in water. While wet strength retention is a desirable characteristic in packaging materials, it presents a disposal problem because paper products having such characteristics are degradable only under undesirably severe conditions. Some resins are known which impart temporary wet strength and thus would be suitable for sanitary or disposable paper uses; however, they often suffer from one or more drawbacks. For example, their wet strength is generally of a low magnitude (about one-half of the level achievable for permanent-type resins); they are easily attacked by mold and slime; and/or they can only be prepared as dilute solutions.

Conventional resins, which are able to provide permanent wet strength to paper, typically are obtained by modifying polyamidoamine polymers such as A, with epichlorohydrin (B) ("epi") to form polyamidoamine (PAE)-epichlorohydrin resin.

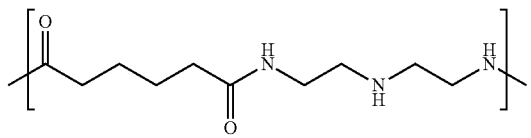

(A)

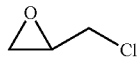

(B)

Conventional resin syntheses capitalize on the difunctional nature of epichlorohydrin to use the epoxy and chlorine groups for both cross-linking and generation of quaternary nitrogen sites.

In these conventional syntheses, the asymmetric functionality of epichlorohydrin leads to ring opening upon reaction of its epoxy group with secondary amines, followed by the pendant chlorohydrin moiety either intra-molecularly cyclizing to generate azetidinium functionality or inter-molecularly (cross-linking) with another polyamidoamine molecule. Thus, the first step of reacting polyamidoamine prepolymer A with epi B occurs with ring-opening of the epoxy group by secondary amine groups of the prepolymer backbone at relatively low temperature. New functionalized polymer C having chlorohydrin pendant groups is generated, and this process typically results in little or no significant change in the prepolymer molecular weight.

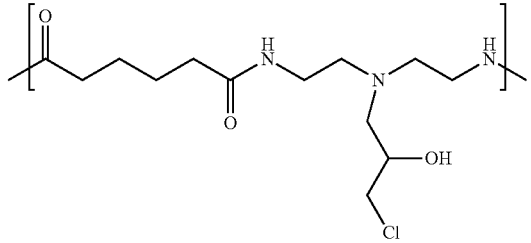

(C)

The second step involves two competing reactions of the pendant chlorohydrin groups: 1) an intramolecular cyclization which generates a cationic azetidinium chloride functionality, in which no increase in molecular weight is observed; and 2) an intermolecular alkylation reaction to cross-link the polymer, which significantly increases its molecular weight. The results of both reactions are illustrated in the PAE-epichlorohydrin resin structure D. In practice, the alkylation of epichlorohydrin, the intra-molecular cyclization and the cross-linking reactions are occurring simultaneously, but at different rates.

(D)

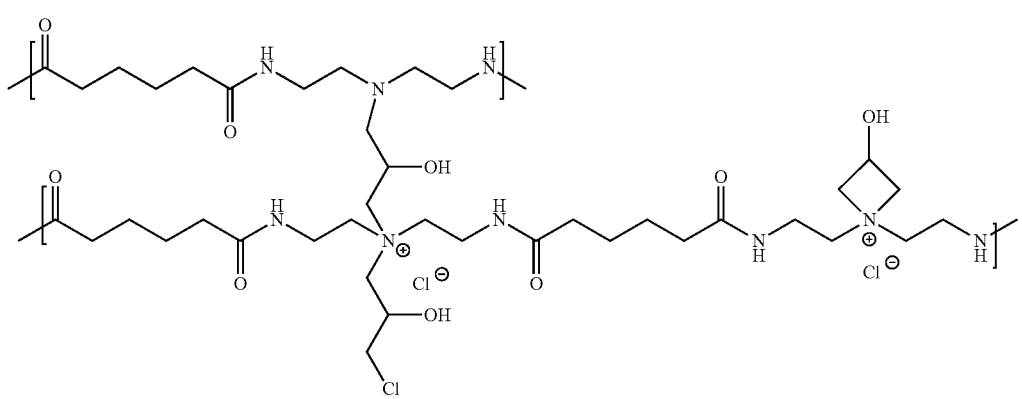

The finished wet strength polymer product contains a small amount of residual pendant chlorohydrin as illustrated in structure D, and a 3-carbon cross-linked group with 2-hydroxyl functionality, with a fairly large amount of quaternary azetidinium chloride functionality. The product also can contain substantial amounts of the epichlorohydrin hydrolysis products 1,3-DCP, and 3-CPD.

1,3-dichloro-2-propanol
1,3-DCP

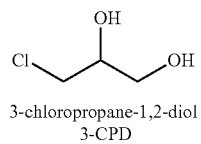

3-chloropropane-1,2-diol
3-CPD

The relative rates of the three main reactions in this conventional method, namely the pendant chlorohydrin formation (ring opening), cyclization to azetidinium ion groups (cationization), and cross-linking (intermolecular alkylation), are approximately 140:4:1, respectively, when carried out at room temperature. Therefore, the pendant chlorohydrin groups form very quickly from ring opening reaction of the epichlorohydrin epoxide and the secondary amine in the prepolymer. This first step is performed at lower temperature (for example, around 25-30° C.).

In the second step, the chlorohydrin groups then relatively slowly cyclizes to form cationic azetidinium groups. Even more slowly, cross-linking occurs, for example, by: 1) a tertiary amine, for example, of a chlorohydrin pendent group reacting with moiety secondary amine; and/or 2) intermolecular alkylation of a tertiary amine with a pendant chlorohydrin moiety.

In order to maintain practical utility for minimum reaction cycle times, the conventional manufacturing process typically requires that the reaction mixture be heated to increase the reaction rates, for example to about 60-70° C. Usually, reactions are also carried out at high solids content in order to maximize reactor throughput and to provide finished wet strength resins at the highest solids possible to minimize shipping costs. High concentration favors the slower, intermolecular reaction. Under these high temperature and high concentration conditions, the reaction rates between intramolecular cyclization and cross-linking become competitive. Thus, one problem encountered in the conventional manufacturing process is that the cross-linking reaction rate becomes fast enough that the desired viscosity end-point (molecular weight) is achieved at the expense of azetidinium ion group formation. If the reaction was allowed to continue beyond the desired viscosity end-point in order to generate higher levels of azetidinium groups, the reaction mixture would likely gel and form a solid mass.

Since both high azetidinium group content and high molecular weights are useful for maximum wet strength efficiency of PAE resins, azetidinium group formation and cross-linking desirably are maximized without gelling the product or providing a product that gels during storage. These conditions, coupled with the desire for high solids to minimize shipping costs, have been limiting aspects of the formation of higher efficiency wet strength resin products.

Therefore, there is a continuing need in the art for methods and compositions for imparting appropriate levels of wet strength to paper products.

SUMMARY OF THE INVENTION

Compositions and methods related to new wet strength resins are provided, in which the prepolymer cross-linking is distinct from the "cationization" process of halohydrin-functionalization and cyclization, a feature that affords substantial flexibility in tailoring the degree of cationic functionality, molecular weight, and other resin properties. The functionally-symmetrical cross-linkers and mono-functional modifiers used to effect cross-linking and functionalization of a prepolymer are different from the reagent used to impart cationic charge to the resin. Specifically, the disclosed methods separate into discrete steps the reaction of the prepolymer with the cross-linkers from the reaction of the intermediate cross-linked prepolymer with the epihalohydrin. Moreover, this process can reduce the amount of epichlorohydrin by-products than typically found in more conventional PAE-epichlorohydrin wet strength resins that are not prepared by this process.

In a further aspect, the disclosed process uses separate compounds or compositions for the cross-linking versus the "cationization" (epichlorohydrin functionalization and quaternization by cyclization) process steps. For example, functionally-symmetrical (or simply "symmetrical") cross-linkers can be employed in this first step, which may provide substantial control over the cross-linking architecture and properties of the partially cross-linked prepolymer, such as a polyamine or polyamidoamine prepolymer. The step of imparting cationic charge to the resin, the "cationization" process, can use any epihalohydrin, and typically uses epichlorohydrin to generate the azetidinium ion functionality. These new methods and resins can exhibit higher azetidinium ion content, additional degrees of reactive functionalization, optimized or maximized molecular weight, and good storage stability.

The new wet strength resins also provide improved wet tensile development over current technologies when used in paper, paperboard, tissue and towel applications. By altering the way in which epichlorohydrin functionalization is effected, the wet strength products obtained have significantly reduced levels of the epichlorohydrin by-products 1,3-dichloro-2-propanol (1,3-DCP or "DCP") and 3-chloropropane-1,2-diol (3-CPD or "CPD"; also MCPD for monochloropropane diol).

Therefore, one aspect of this disclosure provides for a process for preparing a composition for enhancing the wet strength of paper, the process comprising:

a) reacting a polyamine, which may be referred to herein as a polyamine prepolymer, with a symmetric cross-linker to produce a partially cross-linked polyamine;

b) adding a epihalohydrin to the partially cross-linked polyamine to produce a halohydrin-functionalized polymer; and c) cyclizing the halohydrin-functionalized polymer to form the resin having azetidinium moieties.

If desired, the process can further comprise the step of reacting the polyamine prepolymer with a deficiency of a mono-functional modifier comprising one secondary amine-reactive moiety before, during, or after step a), or at different combinations of these times.

Particularly useful polyamine prepolymers are those polyamidoamine (PAE) prepolymers having secondary amine groups. Therefore, further aspects of this disclosure provide for a process for preparing a composition for enhancing the wet strength of paper, the process comprising:

a) reacting the polyamidoamine (PAE) prepolymer having secondary amine groups with a deficiency of the symmetric cross-linker having secondary amine-reactive moieties, to provide a partially cross-linked polyamidoamine prepolymer that retains a portion, typically a majority, of the secondary amine groups present in the polyamidoamine prepolymer;

b) reacting the partially cross-linked polyamidoamine prepolymer with an epihalohydrin to provide a halohydrin-functionalized polymer; and c) forming a resin composition by subjecting the halohydrin-functionalized polymer to conditions sufficient to cyclize at least a portion of the halohydrin groups to form azetidinium ions.

If desired, this process also can further comprise the step of reacting the polyamidoamine prepolymer with a deficiency of a mono-functional modifier comprising one secondary amine-reactive moiety before, during, or after step a), or at different combinations of these times.

This disclosure further provides a resin or a resin composition for enhancing the wet strength of paper, wherein the resin is prepared by a process comprising:

a) reacting a polyamine (polyamine prepolymer) with a symmetric cross-linker to produce a partially cross-linked polyamine;

b) adding a epihalohydrin to the partially cross-linked polyamine to produce a halohydrin-functionalized polymer; and c) cyclizing the halohydrin-functionalized polymer to form the resin having azetidinium moieties.

When the polyamine prepolymer is a polyamidoamine (PAA) prepolymer having secondary amine groups, in this aspect, there is provided a composition for enhancing the wet strength of paper, the composition comprising a polyamidoamine polymer which is symmetrically cross-linked and azetidinium ion-functionalized, the polyamidoamine polymer prepared by the process of:
comprising:

a) reacting the polyamidoamine (PAA) prepolymer having secondary amine groups with a deficiency of the symmetric cross-linker having secondary amine-reactive moieties, to provide a partially cross-linked polyamidoamine prepolymer that retains a portion, typically a majority, of the secondary amine groups present in the polyamidoamine prepolymer;

and if desired, reacting the polyamidoamine prepolymer with a deficiency of a mono-functional modifier comprising one secondary amine-reactive moiety before, during, or after step a);

b) reacting the partially cross-linked polyamidoamine prepolymer with an epihalohydrin to provide a halohydrin-functionalized polymer; and c) forming a resin composition by subjecting the halohydrin-functionalized polymer to conditions sufficient to cyclize at least a portion of the halohydrin groups to form azetidinium ions.

This disclosure also provides a process of treating paper to impart wet strength, the process comprising treating pulp fibers used to make a paper with a resin composition made by:

a) reacting a polyamine with a symmetric cross-linker to produce a partially cross-linked polyamine;

b) adding a epihalohydrin to the partially cross-linked polyamine to produce a halohydrin-functionalized polymer; and c) cyclizing the halohydrin-functionalized polymer to form the resin having azetidinium moieties.

Thus, by using symmetrical cross-linkers and mono-functional modifiers and separating the steps of the reaction with epichlorohydrin, new wet strength resin products are provided in this disclosure. Compared with conventional resins, these products provide higher azetidinium ion content, additional degrees of reactive functionalization, high molecular weight, and good storage stability. In addition to these desirable properties, the new wet strength resins provide improved wet tensile development when used in paper, paperboard, tissue and towel applications. A further benefit of this Invention is that the wet strength products obtained have significantly reduced levels of the epichlorohydrin by-products 1,3-DCP and 3-CPD.

The following detailed description provides further embodiments and aspects of this disclosure.

DETAILED DESCRIPTION OF THE INVENTION

This disclosure encompasses wet strength resin compositions, a process to make wet strength resin compositions, and a process of treating paper to impart wet strength using the disclosed compositions. Using new functionally-symmetrical ("symmetrical") cross-linkers and mono-functional modifiers and separating into discrete steps the reaction of prepolymer with new cross-linkers from the reaction of intermediate cross-linked prepolymer with epichlorohydrin, new wet strength resins with enhanced properties and/or improved flexibility in their synthesis are provided. In addition to providing generally improved wet tensile development over current technologies, the products and method can provide higher azetidinium ion content, additional degrees of reactive functionalization, maximized molecular weight, and good storage stability. Moreover, the wet strength products can have substantially reduced levels of 1,3-DCP and 3-CPD which typically accompany epichlorohydrin wet strength resin synthesis.

Most wet strength resins are obtained by modifying amine-containing polymers (polyamine polymers) such as polyamine, polyamidoamine, polyethyleneimine (PEI), polyvinyl amine, and the like, typically with the intent to add more cationic charges and/or reactive groups and increase their molecular weight.

In one aspect, the polyamine, which may be referred to herein as a polyamine prepolymer, can have the following structure:

wherein R can be alkyl, hydroxyalkyl, amine, amide, aryl, heteroaryl or cycloalkyl. In structure P, w can be an integer from 1 to about 10,000. As provided in the definitions section, the R groups such as "alkyl" or "hydroxyalkyl" are intended to provide a convenient description in which the conventional rules of chemical valence apply; therefore, R of structure P may be described as alkyl or hydroxyalkyl, which is intended to reflect the "R" group is divalent and may alternatively be described as or hydroxyalkylene.

The most widely used and most effective wet strength resin products typically are derived from polyamidoamine prepolymers reacted with epichlorohydrin, to form so-called polyamidoamine-epichlorohydrin (PAE) resins. Therefore, when polyamidoamines are used to exemplify the process or resin of this disclosure, it is intended that the disclosure, process, and resin are not limited to polyamidoamine-based systems, but are applicable to any amine-containing polymer (polyamine) such as structure P and other amine-containing polymers.

Epichlorohydrin is a difunctional compound having different, hence "asymmetric", chemical functionalities, epoxy and chlorine groups. This asymmetric functionality allows epichlorohydrin to ring open upon reaction with the epoxy group with secondary amines, followed by the pendant chlorohydrin moieties being used for both: 1) intramolecular cyclization to generate a cationic azetidinium functionality; or 2) intermolecular cross-linking the polymer to increase molecular weight. Epichlorohydrin resin structure D illustrates the results of both reactions in a polyamidoamine-epichlorohydrin (PAE) resin.

This disclosure provides for formulations and processes for creating new wet strength resins with increased levels of cationic charge from enhanced azetidinium ion content (greater charge density), additional functionality, optimized or maximized molecular weights, and high solids contents and lower concentrations of DCP and CPD. In an aspect, the disclosed method separates the resin synthesis into two separate and controllable steps. The first constructs an intermediate molecular weight, cross-linked prepolymer, prepared upon reacting the PAE prepolymer with a functionally-symmetric cross-linker. Unlike the function of the asymmetric cross-linker epichlorohydrin, the symmetric cross-linkers of this disclosure utilize the same moiety for reaction with both prepolymer secondary amine groups to effect cross-linking. If desired, monofunctional groups can be used before, after, or during the cross-linking step to impart additional functionality to a prepolymer without the cross-linking function. The second step utilizes epichlorohydrin to impart cationic functionality without it be required for any cross-linking function, by using a reduced amount of epichlorohydrin to maximize azetidinium ion formation on the polymer. This new process stands in contrast to conventional practice which is limited by the need to optimize competing azetidinium ion formation and cross-linking mechanisms that occur simultaneously.

Polyamine Prepolymer

A range of polyamines (polyamine prepolymers) can be used as a precursor to the wet strength resins disclosed herein. The polyamine prepolymers comprise primary and/or secondary amine moieties that are linked with at least one spacer.

By way of example, in one aspect, the polyamine, which may be referred to herein as a polyamine prepolymer, can have the following structure:

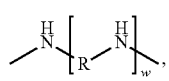

(P)

wherein R can be, for example, alkyl, hydroxyalkyl, amine, amide, aryl, heteroaryl or cycloalkyl. In structure P, w can be an integer from 1 to about 10,000; alternatively, from 1 to about 5,000; alternatively, from 1 to about 3,000; alternatively, from 1 to about 1,000; alternatively, from 1 to about 100; or alternatively, from 1 to about 10. These "R" groups, for example "alkyl", are intended to provide a convenient description of the specified groups that are derived from formally removing one or more hydrogen atoms (as needed for the particular group) from the parent group. Therefore, the term "alkyl" in structure P would apply the conventional rules of chemical valence to apply, but would include, for example, an "alkanediyl group" which is formed by formally removing two hydrogen atoms from an alkane (either two hydrogen atoms from one carbon atom or one hydrogen atom from two different carbon atoms). Such an alkyl group can be substituted or unsubstituted groups, can be acyclic or cyclic groups, and/or may be linear or branched unless otherwise specified. A "hydroxyalkyl" group includes one or more hydroxyl (OH) moieties substituted on the "alkyl" as defined.

In this aspect and unless otherwise indicated, alkyl R of structure P can be an alkyl moiety that is linear (straight chain) or branched. Moiety R can also be a cycloalkyl, that is, a cyclic hydrocarbon moiety having from 1 to about 25 carbon atoms. For example, R can have from 1 to 25, from 1 to 20, from 1 to 15, from 1 to 12, from 1 to 10, from 1 to 8, from 1 to 6, or from 1 to 4 carbon atoms. Also by way of example, R can have from 2 to 10, 2 to 8, 2 to 6, or 2 to 4 carbon atoms. In a further aspect, R can be a $C_1$ moiety, a $C_2$ moiety, a $C_3$ moiety, a $C_4$ moiety, a $C_5$ moiety, a $C_6$ moiety, a $C_7$ moiety, a $C_8$ moiety, a $C_9$ moiety, a $C_{10}$ moiety, a $C_{11}$ moiety, a $C_{12}$ moiety, a $C_{13}$ moiety, a $C_{14}$ moiety, a $C_{15}$ moiety, a $C_{16}$ moiety, a $C_{17}$ moiety, a $C_{18}$ moiety, a $C_{19}$ moiety, a $C_{20}$ moiety, a $C_{21}$ moiety, a $C_{22}$ moiety, a $C_{23}$ moiety, a $C_{24}$ moiety, a $C_{25}$ moiety, a $C_{26}$ moiety, a $C_{27}$ moiety, a $C_{28}$ moiety, a $C_{29}$ moiety, a $C_{30}$ moiety.

In the polyamine prepolymer structure P illustrated supra, R also can be a poly-primary amine, such as polyvinyl amine and its copolymers. Examples of a poly-primary amine that can constitute R in structure P include, but are not limited to the following structures, as well as copolymers with olefins and other unsaturated moieties, where n can be an integer from 1 to about 25:

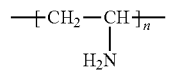

Alternatively, n can be an integer from 1 to about 20; alternatively, from 1 to about 15; alternatively, from 1 to about 12; alternatively, from 1 to about 10; or alternatively, from 1 to about 5. In another aspect, n can be 1, 2, 3, 4, 5, 6, 7, 8, 9, 10, 11, 12, 13, 14, 15, 16, 17, 18, 19, 20, 21, 22, 23, 24, or 25.

Suitable polyamines (polyamine prepolymers) for use in preparing the resins of this disclosure include, but are not limited to, polyalkylene polyamines, such as polyethylenepolyamines including diethylenetriamine (DETA), triethylenetetramine (TETA), aminoethyl piperazine, tetraethylenepentamine, pentaethylenehexamine, N-(2-aminoethyl) piperazine, N,N-bis(2-aminoethyl)-ethylenediamine, diaminoethyl triaminoethylamine, piperazinethyl triethylenetetramine, and the like. Also useful in preparing polyamine prepolymers for use in the resin preparations of this disclosure include, ethylene diamine, low molecular weight polyamidoamines, polyvinylamines, polyethyleneimine (PEI) and copolymers of vinyl amine with other unsaturated co-polymerizable monomers such as vinyl acetate and vinyl alcohol.

According to an aspect of polyamine prepolymer P, w is a number range corresponding to the polyamine prepolymer Mw mol number from about 2,000 to about 1,000,000. The Mw molecular weight of polyamine prepolymer P can also can be from about 5,000 to about 750,000; alternatively, from about 7,500 to about 500,000; alternatively, from about 10,000 to about 200,000; alternatively, from about 20,000 to about 150,000; or alternatively, from about 30,000 to about 100,000.

Polyamidoamine Prepolymer

A range of polyamidoamine prepolymers also can be used as a precursor to the wet strength resins according to this disclosure. The polyamidoamine prepolymers are made by the reaction of a polyalkylene polyamine having at least two primary amine groups and at least one secondary amine group with a dicarboxylic acid, in a process to form a long chain polyamide containing the recurring groups as disclosed herein. In one aspect, the polyamidoamine prepolymer can have the following structure:

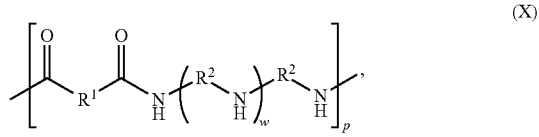
(X)

wherein $R^1$ is $(CH_2)_m$ where m is 2, 3, 4, or 5; $R^2$ is $(CH_2)_n$ where n is 2, 3, or 4; w is 1, 2, or 3; and p is a number range corresponding to the polyamidoamine prepolymer Mw molecular weight from about 2,000 to about 1,000,000. The Mw molecular weight also can be from about 5,000 to about 100,000; alternatively, from about 7,500 to about 80,000; alternatively, from about 10,000 to about 60,000; alternatively, from about 20,000 to about 55,000; or alternatively, from about 30,000 to about 50,000.

In an aspect, the polyamidoamine prepolymer can have the following structure:

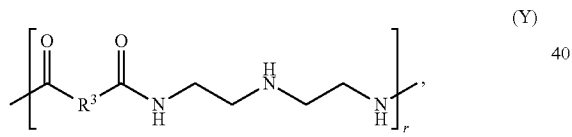
(Y)

wherein $R^3$ is $(CH_2)_q$ where q is ranging from 0 to 40; and r is a number range corresponding to the polyamidoamine prepolymer Mw molecular weight from about 2,000 to about 1,000,000. Similarly, the Mw molecular weight also can be from about 5,000 to about 100,000; alternatively, from about 7,500 to about 80,000; alternatively, from about 10,000 to about 60,000; alternatively, from about 20,000 to about 55,000; or alternatively, from about 30,000 to about 50,000. Thus, in the structure $(CH_2)_q$, q can also range from 0 to about 40; alternatively, from 0 to about 35; alternatively, from 0 to about 30; alternatively, from 0 to about 25; alternatively, from 0 to about 20; alternatively, from 0 to about 15; alternatively, from 0 to about 12; alternatively, from 1 to about 12; alternatively, from 1 to about 10; alternatively, from 1 to about 8; or alternatively, from 1 to about 6.

In a further aspect, the polyamidoamine prepolymer also may have the following structure:

—[—NH($C_nH_{2n}$—NH)$_p$—CO—($CH_2$)$_m$—CO—]—  (Z), wherein n is 1 to 8; p is 2 to 5; and m is 0 to 40, and similar molecular weight ranges apply.

As disclosed, suitable polyamidoamines are generally prepared by reacting a dicarboxylic acid (diacid), or a corresponding dicarboxylic acid halide or diester thereof, with a polyamine such as a polyalkylene polyamine. Suitable polyamines include those polyamines (polyamine prepolymers) disclosed herein that can be used as precursors for the wet strength resins themselves. For example, useful polyamidoamines can be made by reacting suitable polyalkylene polyamines, such as polyethylenepolyamines including ethylenediamine itself, Diethylenetriamine (DETA), triethylenetetramine (TETA), aminoethyl piperazine, tetraethylenepentamine, pentaethylenehexamine, N-(2-aminoethyl)piperazine, N,N-bis(2-aminoethyl)-ethylenediamine, diaminoethyl triaminoethylamine, piperazinethyl triethylenetetramine, and the like, with polycarboxylic acids such as succinic, glutaric, 2-methylsuccinic, adipic, pimelic, suberic, azelaic, sebacic, undecanedioic, dodecandioic, 2-methylglutaric, 3,3-dimethylglutaric and tricarboxypentanes such as 4-carboxypimelic; alicyclic saturated acids such as 1,2-cyclohexanedicarboxylic, 1-3-cyclohexanedicarboxylic, 1,4-cyclohexanedicarboxylic and 1-3-cyclopentanedicarboxylic; unsaturated aliphatic acids such as maleic, fumaric, itaconic, citraconic, mesaconic, aconitic and hexane-3-diotic; unsaturated alicyclic acids such as Δ4-cyclohexenedicarboxylic; aromatic acids such as phthalic, isophtalic, terephthalic, 2,3-naphthalenedicarboxylic, benzene-1,4-diacetic, and heteroaliphatic acids such as diglycolic, thiodiglycolic, dithiodiglycolic, iminodiacetic and methyliminodiacetic. Usually, diacids and their related diesters of the formula $RO_2C(CH_2)_nCO_2R$ (where n=1 to 10 and R=H, methyl, or ethyl) and mixtures thereof are preferred. Adipic acid is readily available and is often used.

Symmetric Cross-Linker

Generally, the secondary amines of the polyamine prepolymers are reacted with one or more symmetrical cross-linkers. In an aspect, this reaction provides for a greater degree of control over the cross-linking process, and provides an intermediate cross-linked prepolymer with higher molecular weight than the starting prepolymer. The viscosity end-point and thus the molecular weight of the intermediate can be easily pre-determined and controlled simply by the amount of symmetrical cross-linker employed. The cross-linking reaction will proceed to an end-point as cross-linker is consumed and stop when consumption of cross-linker is complete. A decreased and measurable amount of secondary amine functionality will remain available for further functionalization.

In this cross-linking step, the polyamine prepolymer typically is reacted with a deficiency of the symmetric cross-linker, based on the total amount of secondary amines available for cross-linking, to provide a partially cross-linked polyamine prepolymer. Thus, the partially cross-linked polyamine prepolymer has a higher molecular weight than the polyamine prepolymer, even though it is an intermediate in the process and it retains a portion of the secondary amine groups present in the polyamine prepolymer. In a further aspect, the partially cross-linked prepolymer retains a majority of the secondary amine groups present in the polyamine prepolymer, because less than 50% of the stoichiometry amount of symmetric cross-linker typically is used.

Based on the prepolymer repeating unit having a single secondary amine subject to reaction, and the symmetric cross-linker having two reactive moieties, a stoichiometric reaction of prepolymer to cross-linker requires 2:1 molar ration, and practically, a 2:1 or higher molar ratio of prepolymer to cross-linker is utilized. In one aspect, the symmetric cross-linker to prepolymer molar ratios can be selected to provide more than 0%, but less than 50%, less than 45%, less than 40%, less than 35%, less than 30%, less than 25%, less than 20%, less than 15%, less than 10%, less than 5%, less than 4%, less than 3%, less than 2%, less than 1%, less than 0.75%, or less than 0.5% of the stoichiometric ratio of cross-linker to prepolymer. These values reflect the combined molar amounts when using more than one symmetric cross-linker.

Examples of symmetric cross-linkers include, but are not limited to, a di-acrylate, a bis(acrylamide), a di-epoxide, and a polyazetidinium compound. By way of example, useful symmetric cross-linkers can be selected from or can comprise, the following:

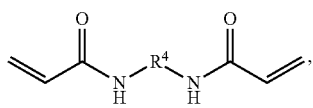

where $R^4$ is $(CH_2)_t$, and where t is 1, 2, or 3;

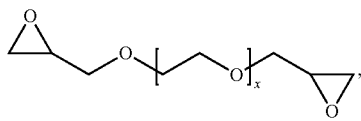

where x is from 1 to about 100;

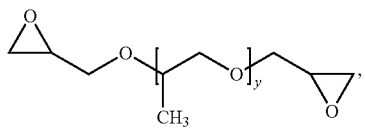

where y is from 1 to about 100;

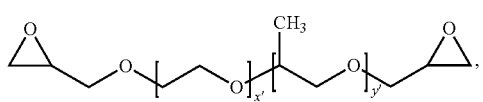

where x'+y' is from 1 to about 100; and/or

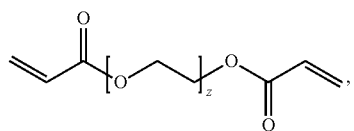

where z is from 1 to about 100; including any combination thereof.

Specific examples of symmetric cross-linkers can be selected from, or alternatively can comprise, N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds, and any combination thereof.

In accordance with a further aspect, the symmetric cross-linker can be selected from or can comprise certain polymers or co-polymers that have a type of functional moiety that is reactive with secondary amines, that is, that can function as a symmetrical cross-linker according to this disclosure. In one aspect, these polymeric symmetric cross-linkers can be polymers or copolymers that comprise azetidinium functional groups. These polymeric symmetric cross-linkers can be, for example, copolymers of acrylates, methacrylates, alkenes, dienes, and the like, with azetidinium-functionalized monomers such as 1-isopropyl-3-(methacryloyloxy)-1-methylazetidinium chloride Q or 1,1-diallyl-3-hydroxyazetidinium chloride R, the structures of which are illustrated.

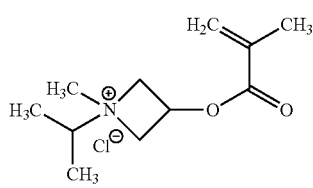

Q

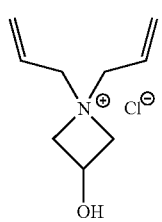

R

The polymeric symmetric cross-linkers also can be or can comprise, for example, copolymers of acrylates, methacrylates, alkenes, dienes, and the like, with other azetidinium-functionalized monomers such as compounds S, T, or U, as shown here.

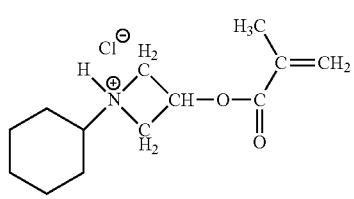

S

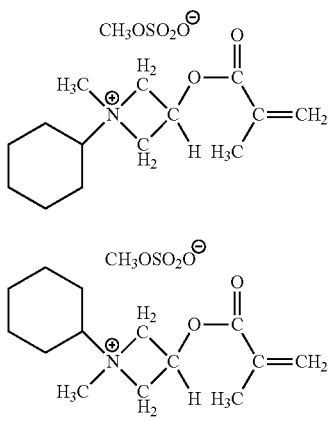

In this aspect, the symmetric cross-linker can be selected from or can comprise a copolymer of an acrylate, a methacrylate, an alkene, or a diene, with an azetidinium-functionalized monomer selected from Q, R, S, T, U, and a combination thereof, wherein the fraction of azetidinium-functionalized monomer to acrylate, methacrylate, alkene, or diene monomer in the copolymer can be from about 0.1% to about 12%. In a further aspect, the fraction of azetidinium-functionalized monomer to acrylate, methacrylate, alkene, or diene monomer in the copolymer can be from about 0.2% to about 10%; alternatively, from about 0.2% to about 10%; alternatively, from about 0.5% to about 8%; alternatively, from about 0.75% to about 6%; or alternatively, from about 1% to about 5%. Examples of these types of symmetric cross-linker polymers and co-polymers can be found in the following references, each of which is incorporated herein by reference in pertinent part: Y. Bogaert, E. Goethals and E. Schacht, *Makromol. Chem.*, 182, 2687-2693 (1981); M. Coskun, H. Erten, K. Demirelli and M. Ahmedzade, *Polym. Degrad. Stab.*, 69, 245-249 (2000); and U.S. Pat. No. 5,510,004.

In accordance with an aspect, the symmetric cross-linker can be selected from or can comprise a minimally azetidinium-functionalized polyamidoamine. That is, polyamidoamine can have minimal azetidinium functionalization, which is the reactive moiety in this type of symmetric cross-linker. In this case, the cross-linking function is effected by the azetidinium moieties, which can react with secondary amines of the polyamidoamine prepolymer. Polyamidoamines that are suitable for preparing minimally azetidinium-functionalized polyamidoamines are the same general structures and formulas that can be used for the preparation of the resin itself, such as structures X, Y, and Z illustrated herein. An example of a minimally azetidinium-functionalized polyamidoamine suitable for use as a symmetric cross-linker is illustrated in the following structure:

wherein p≥2 the q/p ratio is from about 10 to about 1000, and where the structure includes at least two azetidinium moieties that function to cross-link, and that qualify a structure such as X as a functionally-symmetrical cross-linker. As the q/p ratio indicates, there is a small fraction of azetidinium moieties as compared to acid and amine residues. Moreover, the polyamidoamine X also can have the structure wherein the q/p ratio is from about 12 to about 500; alternatively, from about 14 to about 400; alternatively, from about 16 to about 300; alternatively, from about 18 to about 200; or alternatively, from about 20 to about 100. One type of minimally azetidinium-functionalized polyamidoamine is provided in, for example, U.S. Pat. No. 6,277,242, which is hereby incorporated by reference in pertinent part.

As illustrated by the molar ratios of the symmetric cross-linker to the PAE prepolymer, generally, a relatively small fraction of the available secondary amine sites are subject to cross-linking to form the branched or partially cross-linked polyamidoamine prepolymer. In addition to the molar ratios provided herein, for example, the symmetric cross-linker to prepolymer molar ratios can be selected to provide from 0.01% to 5% of the stoichiometric ratio of cross-linker to prepolymer. In a further aspect, the symmetric cross-linker to prepolymer molar ratios can provide from 0.1% to 4%; alternatively, from 0.2% to 3.5%; alternatively, from 0.3% to 3%; alternatively, from 0.4% to 2.5%; alternatively, from 0.5% to 2%; or alternatively, from 0.6% to 1.5% of the stoichiometric ratio of cross-linker to prepolymer. These values reflect the combined molar amounts when using more than one symmetric cross-linker.

By way of example, using a polyamidoamine prepolymer derived from adipic acid and diethylenetriamine (DETA) as an example, and cross-linking the prepolymer using methylene-bis-acrylamide (MBA), the partially cross-linked polyamidoamine prepolymer can be illustrated by the following structure:

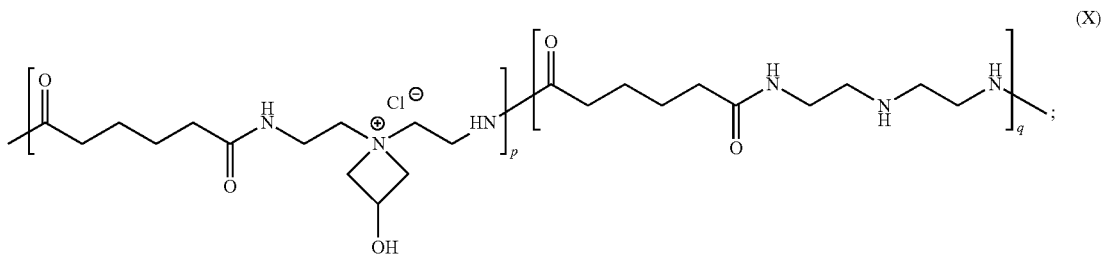

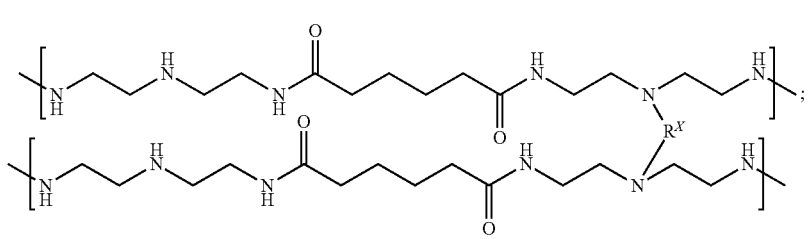

wherein the $R^X$ bridging moiety has the structure:

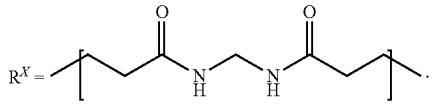

This illustration does not reflect the use of any mono-functional modifiers (infra) in addition to the symmetrical cross-linker.

Mono-Functional Modifier

The secondary amine groups of the polyamine prepolymers also can be reacted with one or more mono-functional compounds to impart any desired chemical functionality to the prepolymer. The mono-functional compounds have a reactive group able to react with secondary or primary amine and a non-reactive part which can be cationic (to increase the cationic charge density), hydrophilic or hydrophobic (to adjust the interaction with non-ionic segments of the cellulose fibers). As desired, the polyamine prepolymer can be reacted with a deficiency of a mono-functional modifier comprising one secondary amine-reactive moiety either before, during, or after, the step of reacting the polyamine prepolymer with a deficiency of the symmetric cross-linker. Further, the reaction with a stoichiometric deficiency of a mono-functional modifier can also be carried using any combination of reaction or addition before, during, or after, reaction with the symmetric cross-linker.

For example, in an aspect, the mono-functional modifier can be selected from or can comprise a neutral or cationic acrylate compound, a neutral or cationic acrylamide compound, an acrylonitrile compound, a mono-epoxide compound, or any combination thereof. According to a further aspect, the mono-functional modifier can be selected from or can comprise an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, and any combination thereof. Examples of mono-functional modifiers are illustrated below.

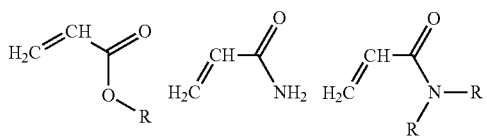

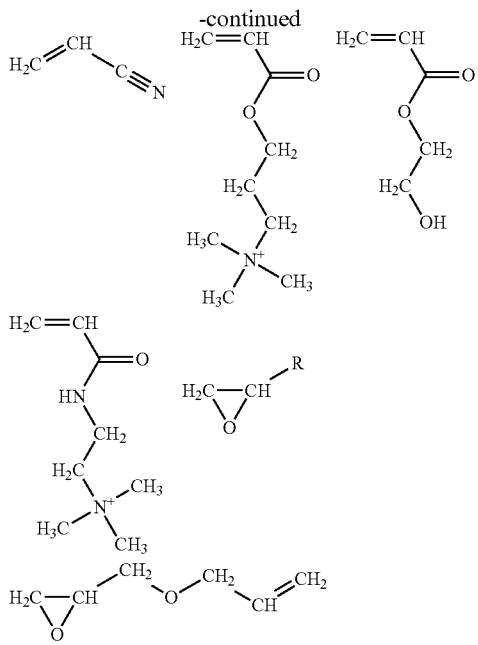

For example, the mono-functional modifier can be selected from or alternatively can comprises at least one of: methyl acrylate; alkyl acrylate; acrylamide; N-methylacrylamide; N,N-dimethylacrylamide; acrylonitrile; 2-methyloxirane; 2-ethyloxirane; 2-propyloxirane; 2-(allyloxymethyl)oxirane; 2-hydroxyethyl acrylate; 2-(2-hydroxyethoxy)ethyl acrylate; 2-(acryloyloxy)-N,N,N-trimethylethanaminium; 3-(acryloyloxy)-N,N,N-trimethylpropan-1-aminium; 2-acrylamido-N,N,N-trimethylethanaminium; 3-acrylamido-N,N,N-trimethylpropan-1-aminium; and 1-isopropyl-3-(methacryloyloxy)-1-methylazetidinium chloride. Depending upon the structure of the modifier, it is seen that upon reaction of these compounds with secondary or primary amine, the portion that is non-reactive toward the amine can impart cationic charge to assist in increasing the cationic charge density, can alter the hydrophilic or hydrophobic characteristics, for example to adjust the interaction with non-ionic segments of the cellulose fibers, and/or can affect other properties of the resulting intermediate cross-linked prepolymer.

Halohydrin-Functionalized Polymer and Intramolecular Cyclization

Generally, by separating into discrete steps the reaction of the polyamine prepolymer with the cross-linkers from the reaction of the intermediate cross-linked prepolymer with the epichlorohydrin, the second reaction step requires less epichlorohydrin than conventional methods to reach the desired end-point. Further, this second reaction step can be effected under reaction conditions which favor optimized azetidinium group formation over further cross-linking. The asymmetric functionality of epichlorohydrin is useful in this functionalization to allow a relatively facile reaction of the epoxy group with secondary amines to form a pendant chlorohydrin moiety, followed by an intramolecularly cyclization of the pendant chlorohydrin to generate a cationic azetidinium functionality. This latter intramolecular cyclization typically utilizes heating of the halohydrin-functionalized polymer.

In an aspect, the second reaction step can be carried out using any epihalohydrin, such as epichlorohydrin, epibromohydrin, and epiiodohydrin, or any combination thereof. However, epichlorohydrin is typically the most common epihalohydrin used in this reaction step. When reciting epichlorohydrin in this disclosure, such as in structures or reaction schemes, it is understood that any of the epihalohydrins can be used in the process.

By way of example, using the partially cross-linked polyamidoamine prepolymer illustrated supra that was derived from adipic acid and DETA and cross-linking using MBA, the epichlorohydrin functionalization product can illustrated by the following structure, termed a "halohydrin-functionalized polymer".

to about 1.45 moles of epichlorohydrin per mole of secondary amine can be used. For example, the moles of epichlorohydrin per mole of secondary amine can be about 0.8, about 0.9, about 1.0, about 1.1, about 1.2, about 1.3, about 1.4, about 1.5, or about 1.6.

A further aspect of the process of this disclosure is that sufficient amounts of symmetric cross-linker and epihalohydrin can be employed such that the resin composition prepared by the process can comprises substantially no secondary amine groups. This results is typically effected by using the molar amounts and ratios disclosed herein, but resin compositions prepared by this disclosure can comprises substantially no secondary amine groups even when molar amounts and ratios outside those recited are used. By substantially no secondary amine groups, it is intended to disclose that less than 10% of the original secondary amines in the starting PAE resin prior to it cross-linking, functionalization, and cationization reactions remain. Alternatively, less than 5%; alternatively, less than 2%; alternatively, less than 1%; alternatively, less than 0.5%; alternatively, less than 0.2%; alternatively, less than 0.1%; alternatively, less than 0.01%; alternatively, less than 0.005%; or alternatively, less than 0.001% of the original secondary amines in the starting PAE resin remain.

The halohydrin (typically chlorohydrin)-functionalized polymer subsequently is converted to the wet-strength resin (Y)

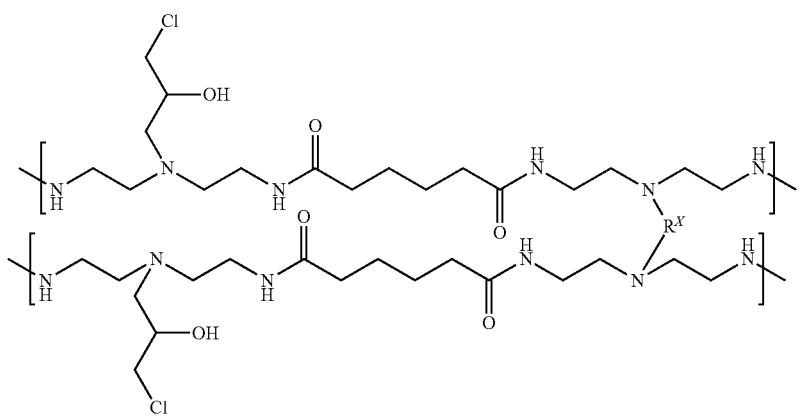

As before, this illustration does not reflect the use of any mono-functional modifiers in addition to the symmetrical cross-linker.

The reaction of epihalohydrins such as epichlorohydrin is generally tailored to consume a high percentage or the remaining secondary amine moieties in generating the halohydrin-functionalized polymer, in this case, a chlorohydrin-functionalized polymer.

The formation of the halohydrin-functionalized polymer can be carried out using a range of epichlorohydrin molar ratios, but this reaction is typically carried out using an excess of epichlorohydrin. The stoichiometric reaction of epichlorohydrin with a secondary amine group requires a 1:1 molar ratio of epichlorohydrin with a secondary amine. In an aspect, from about 0.8 mole to about 3 moles of epichlorohydrin per mole of secondary amine can be used. Alternatively, from about 0.9 mole to about 2.5 moles of epichlorohydrin per mole of secondary amine; alternatively, from about 1.0 mole to about 2.0 moles; alternatively, from about 1.1 mole to about 1.7 moles; alternatively, from about 1.2 mole to about 1.5 moles; alternatively, from about 1.25 mole composition by subjected it to cyclization conditions to form azetidinium ions. This step typically utilizes a heating of the chlorohydrin-functionalized polymer. In contrast to the conventional method in which heating induces both cross-linking and cyclization, the cross-linking portion of this process is complete when the cyclization is carried out, thereby affording greater process control and the ability to more closely tailor the desired properties of the resulting resin. Also in contrast to the conventional method, the process of this disclosure reduces and/or minimizes the formation of the epichlorohydrin by-products 1,3-dichloro-2-propanol (1,3-DCP or "DCP") and 3-chloropropane-1,2-diol (3-CPD or "CPD") remaining in the resin can be reduced or minimized.

According to one aspect of the disclosure, the concentration of epichlorohydrin 1,3-dichloro-2-propanol (1,3-DCP) remaining in the wet strength resin at 25% solids (DCP @ 25%) can be less than about 15,000 ppm; alternatively, less than about 14,000 ppm; alternatively, less than about 13,000 ppm; alternatively, less than about 12,000 ppm; alternatively, less than about 11,500 ppm; alternatively, less than about 11,000 ppm; alternatively, less than about 10,500 ppm; alternatively, less than about 10,000 ppm; alternatively, less than about 8,000 ppm; alternatively, less than about 6,000 ppm; or alternatively, less than about 5,000 ppm.

The following resin composition structure Z illustrates the results of the cyclization step to form the quaternary nitrogen ("cationization") based on the chlorohydrin-functionalized polymer Y shown supra, which has been subjected to conditions sufficient to intramolecularly cyclize the pendant chlorohydrin to impart azetidinium functionality.

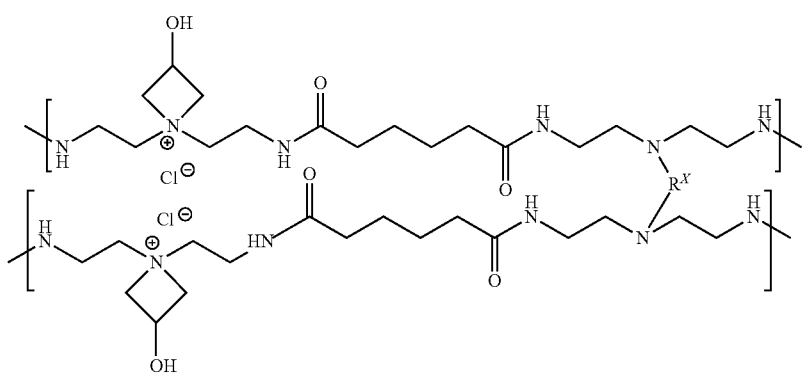

(Z)

In the process for forming the resin compositions, the resin composition is generated by subjecting the halohydrin-functionalized polymer to cyclization conditions sufficient to convert the halohydrin groups to form azetidinium ions. In one aspect, at least a portion of the halohydrin groups are cyclized to form azetidinium ions. According to a further aspect, at least 90% of the halohydrin groups are cyclized to form azetidinium ions. Alternatively, at least 95%; alternatively, at least 97%; alternatively, at least 98%; alternatively, at least 98.5%; alternatively, at least 99%; alternatively, at least 99.5%; alternatively, at least 99.7%; alternatively, at least 99.8%; or alternatively, at least 99.9% of the halohydrin groups are cyclized to form azetidinium ions.

Additional steps in the resin processing can be used, for example, to adjust the solids content of the composition, beyond those described in detail above. For example, the resin composition is generated by converting the halohydrin-functionalized polymer to a azetidinium functionalized polymer. Following this step, the polymer composition can be adjusted by pH such that the pH of the resin composition can be from about pH 2.0 to about pH 4.5. Alternatively, the pH of the resin can be from about pH 2.2 to about pH 4.2; alternatively, from about pH 2.5 to about pH 4.0; or alternatively, from about pH 2.7 to about pH 3.7. This pH adjustment step also may be followed by the step of adjusting the solids content of the composition from about 10% to about 50% to form the wet strength resin. Alternatively, the solids content of the composition can be adjusted from about 15% to about 40% or alternatively from about 20% to about 30% to form the wet strength resin. In one aspect, the wet strength resin can have a solids content of about 25%.

The resulting wet strength resin can have a charge density that is enhanced over that of conventional resins. For example, the wet strength resin can have a charge density of about 2 to about 4 mEq/g of solids. Alternatively, the wet strength resin can have a charge density from about 2.25 to about 3.5 mEq/g of solids; alternatively, from about 2.3 to about 3.35 mEq/g of solids; alternatively, from about 2.4 to about 3.2 mEq/g of solids; or alternatively, from about 2.5 to about 3.0 mEq/g of solids.

The resulting wet strength resin also can have a ratio of azetidinium ions to amide residues in the wet strength resin, which we abbreviate by "Azet", from about 0.4 to about 1.3. The Azet ratio also can be from about 0.5 to about 1.15; alternatively, from about 0.6 to about 1.0; or alternatively, from about 0.7 to about 0.9. In a further aspect, the ratio of azetidinium ions to secondary amine moieties in the resin can be from about 0.4 to about 1.0. The Azet ratio can be measured by quantitative $^{13}C$ NMR by comparing the methylene carbons of the azetidinium versus the methylenes of the acid residue in the backbone.

In another aspect, this disclosure provides wet strength resins that can have a Mw molecular weight from about $0.02 \times 10^6$ to about $3.0 \times 10^6$. Alternatively, the resins that can have a Mw molecular weight from about $0.05 \times 10^6$ to about $2.5 \times 10^6$; alternatively, from about $0.1 \times 10^6$ to about $2.0 \times 10^6$; alternatively, from about $0.5 \times 10^6$ to about $1.5 \times 10^6$; or alternatively, from about $1 \times 10^6$ to about $1.0 \times 10^6$. In further embodiments, the resin that can have a Mw molecular weight from about $0.05 \times 10^6$ to about $1.7 \times 10^6$. The Mw molecular weight also can be from about $0.6 \times 10^6$ to about $1.6 \times 10^6$; alternatively, from about $0.7 \times 10^6$ to about $1.5 \times 10^6$; alternatively, from about $0.8 \times 10^6$ to about $1.3 \times 10^6$; or alternatively, from about $0.9 \times 10^6$ to about $1.1 \times 10^6$.

Further aspects of the wet strength resin of this disclosure provide that the azetidinium equivalent weight, defined as the degree of polymerization multiplied times the Azet ratio, or (degree of polymerization)×(Azet), of from about 1,600 to about 3,800. Alternatively, the azetidinium equivalent weight can be from about 1,800 to about 3,500, or alternatively, from about 2,000 to about 2,900.

The wet strength resin composition of this disclosure further can possess various combinations of the disclosed properties. For example, the wet strength resin composition can exhibit or possess at least two, at least three, at least four, or at least five of the disclosed properties of charge density, Azet ratio, Mw molecular weight, azetidinium equivalent weight, 1,3-DCP content, halohydrin groups are cyclized to form azetidinium ions, and the like. For example, the wet strength resin composition can exhibit or posses at least two, at least three, at least four, or all five of the following characteristic features:

a) a charge density of about 2.25 to about 3.5 mEq/g of solids;

b) a ratio of azetidinium ions to amide residues in the wet strength resin is from about 0.7 to about 0.9;

c) a Mw molecular weight from about $0.05 \times 10^6$ to about $1.5 \times 10^6$;

d) an azetidinium equivalent weight of from about 1,800 to about 3,500; and e) a 1,3-dichloro-2-propanol (1,3-DCP) content of less than about 10,000 ppm when the solids content is about 25%.

Comparison with Conventional Wet Strength Resin Systems

As described for the conventional wet strength resin preparation, the relative rates of the three main reactions in this conventional method, namely the pendant chlorohydrin formation (ring opening), cyclization to azetidinium ion groups (cationization), and cross-linking (intermolecular alkylation), are approximately 140:4:1, respectively, when carried out at room temperature. Therefore, the pendant chlorohydrin groups form very quickly from ring opening reaction of the epichlorohydrin epoxide and the secondary amine in the prepolymer using about a 1:1 molar ratio of epichlorohydrin to secondary amine. The chlorohydrin groups then relatively slowly cyclizes to form cationic azetidinium groups. Even more slowly, cross-linking occurs, for example, by: 1) a tertiary amine, for example, of a chlorohydrin pendent group reacting with an azetidinium moiety; and/or 2) intermolecular alkylation of a tertiary amine with a pendant chlorohydrin moiety. Thus, at the cross-linking stage in the reaction scheme, there are substantially no remaining secondary amine groups. Cross-linking results in an increase in molecular weight, which is manifested in the increase in resin viscosity.

In order to maintain practical utility for minimum reaction cycle times, the manufacturing process typically is carried out under high temperature and high concentration conditions, where the reaction rates between intramolecular cyclization and cross-linking become competitive. Thus, one problem encountered in the conventional manufacturing process is that the cross-linking reaction rate becomes fast enough that the desired viscosity end-point (molecular weight) is achieved at the expense of azetidinium ion group formation. If the reaction was allowed to continue beyond the desired viscosity end-point in order to generate higher levels of azetidinium groups, the reaction mixture would likely gel and form a solid mass.

Since both high azetidinium group content and high molecular weights are useful for maximum wet strength efficiency of PAE resins, azetidinium group formation and cross-linking desirably are maximized without gelling the product or providing a product that gels during storage. These conditions, coupled with the desire for high solids to minimize shipping costs, have been limiting aspects of the formation of higher efficiency wet strength resin products.

In contrast, the wet strength resin composition and process disclosed herein address these issued by providing higher azetidinium ion content, additional degrees of reactive functionalization, increased molecular weight, and very good storage stability. The new wet strength resins provide improved wet tensile development over current technologies when used in paper, paperboard, tissue and towel applications.

A comparison of wet strength resin properties with standard commercially available wet strength resins is provided in the Examples and Tables. The wet strength resin properties of the resin prepared according to this disclosure were examined and compared to standard commercially available wet strength resin products, including the AMRES® series (Georgia-Pacific) of resins and the KYMENE® (Ashland) resins. Both properties of the resins themselves and the performance of the resins for imparting wet strength are compared in the following tables. The data illustrate (Table 1) significant improvements in resin properties such as increased charge density, higher proportion of azetidinium ions to amide residues, higher molecular weight, greater azetidinium equivalent weight, and lower byproduct contaminant were observed in the disclosed resins as compared to conventional resins.

According to a further aspect of this disclosure, there is provided a resin or resin composition for enhancing the wet strength of paper, the resin or resin composition prepared by the process of:

a) reacting a polyamine with a symmetric cross-linker to produce a partially cross-linked polyamine;

b) adding a epihalohydrin to the partially cross-linked polyamine to produce a halohydrin-functionalized polymer; and c) cyclizing the halohydrin-functionalized polymer to form the resin having azetidinium moieties.

When the polyamine (polyamine prepolymer) is selected from a polyamidoamine prepolymer, a further aspect of this disclosure provides a resin or resin composition for enhancing the wet strength of paper, the resin or resin composition comprising a polyamidoamine polymer which is symmetrically cross-linked and azetidinium ion-functionalized, the polyamidoamine polymer prepared by the process of:

a) reacting a polyamidoamine (PAA) prepolymer having secondary amine groups with a deficiency of a symmetric cross-linker having secondary amine-reactive moieties, to provide a partially cross-linked polyamidoamine prepolymer that retains a portion, typically a majority, of the secondary amine groups present in the polyamidoamine prepolymer;

and if desired, reacting the polyamidoamine prepolymer with a deficiency of a mono-functional modifier comprising one secondary amine-reactive moiety before, during, or after step a);

b) reacting the partially cross-linked polyamidoamine prepolymer with an epihalohydrin to provide a halohydrin-functionalized polymer; and c) forming a resin composition by subjecting the halohydrin-functionalized polymer to conditions sufficient to cyclize at least a portion of the halohydrin groups to form azetidinium ions.

Any paper strengthened with the composition or by the process of this disclosure is also an aspect of this disclosure and provided for herein. Moreover, a process of treating paper to impart wet strength, comprising treating pulp fibers used to make the paper with dry resin solids, wherein the resin is any resin in the present disclosure. For example, this disclosure provides process of treating paper to impart wet strength, the process comprising treating pulp fibers used to make a paper with from about 0.05% to about 2% by weight dry resin solids based on the dry weight of the pulp fiber of a cationic thermosetting resin or resin composition, in which the resin or resin composition is made in accordance with this disclosure. The process of treating paper to impart wet strength can comprise treating pulp fibers used to make a paper with from about 0.01% to about 2% by weight dry resin solids based on the dry weight of the pulp fiber of a cationic thermosetting resin composition. Alternatively, the process can employ from about 0.05% to about 1.8% by weight; alternatively, from about 0.075% to about 1.6% by weight; or alternatively, from about 0.1% to about 1.5% by weight dry resin solids based on the dry weight of the pulp fiber.

Although each resin composition property disclosed herein is explained in detail independent of other properties, it is intended that any resin composition property can occur with any other resin property or properties in the disclosed resins. For example, and not as a limitation, the disclosure of the properties herein encompasses a composition that can have at least one, at least two, at least three, at least four, or at least five of the following properties:

a) a charge density of about 1.0 to about 4.0 mEq/g of solids;

b) a ratio of azetidinium ions to amide residues in the resin is from about 0.5 to about 0.9;

c) a molecular weight from about $0.05 \times 10^6$ to about $3.0 \times 10^6$;

d) an azetidinium equivalent weight of from about 1,800 to about 3,500; and e) a 1,3-dichloro-2-propanol (1,3-DCP) content of less than about 10,000 ppm when the solids content is about 25%.

To define more clearly the terms used herein, the following definitions are provided, which are applicable to this disclosure unless otherwise indicated, as long as the definition does not render indefinite or non-enabled any claim to which that definition is applied, for example, by failing to adhere to the conventional rules of chemical valence. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence of absence of a branched underlying structure or backbone.

The term "substituted" when used to describe a group, for example, when referring to a substituted analog of a particular group, is intended to describe any non-hydrogen moiety that formally replaces a hydrogen in that group, and is intended to be non-limiting. However, applicants reserve the right to proviso out any group, for example, to limit the scope of any claim to account for a prior disclosure of which Applicants may be unaware. A group or group may also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents as specified and as understood by one of ordinary skill in the art.

The term "alkyl group" as used herein is a general term that refers to a group formed by removing one or more hydrogen atoms (as needed for the particular group) from an alkane. Therefore, an "alkyl group" includes the definition specified by IUPAC of a univalent group formed by formally removing a hydrogen atom from an alkane but also includes, for example, an "alkanediyl group" which is formed by formally removing two hydrogen atoms from an alkane (either two hydrogen atoms from one carbon atom or one hydrogen atom from two different carbon atoms) when the context requires or allows, as long as the usual rules of chemical valence are applied. An alkyl group can be substituted or unsubstituted groups, can be acyclic or cyclic groups, and/or may be linear or branched unless otherwise specified.

The term "cycloalkyl group" as used herein is a general term that refers to a group formed by removing one or more hydrogen atoms (as needed for the particular group) from a cycloalkane. Therefore, an "cycloalkyl group" includes the definition specified by IUPAC of a univalent group formed by formally removing a hydrogen atom from an cycloalkane but also includes, for example, an "cycloalkanediyl group" which is formed by formally removing two hydrogen atoms from an alkane (either two hydrogen atoms from one carbon atom or one hydrogen atom from two different carbon atoms) when the context requires or allows, as long as the usual rules of chemical valence are applied. An alkyl group can be substituted or unsubstituted groups, can be acyclic or cyclic groups, and/or may be linear or branched unless otherwise specified. When two hydrogens are formally removed from cycloalkane to form a "cycloalkyl" group, the two hydrogen atoms can be formally removed from the same ring carbon, from two different ring carbons, or from one ring carbon and one carbon atom that is not a ring carbon.

An "aryl group" refers to a group formed by removing one or more hydrogen atoms (as needed for the particular group and at least one of which is an aromatic ring carbon atom) from an aromatic compound, specifically, an arene. Therefore, an "aryl group" includes a univalent group formed by formally removing a hydrogen atom from an arene, but also includes, for example, an "arenediyl group" arising from formally removing two hydrogen atoms (at least one of which is from an aromatic hydrocarbon ring carbon) from an arene. Thus, an aromatic compound is compound containing a cyclically conjugated hydrocarbon that follows the Hickel (4n+2) rule and containing (4n+2) pi-electrons, where n is an integer from 1 to about 5. Therefore, aromatic compounds and hence "aryl groups" may be monocyclic or polycyclic unless otherwise specified.

A "heteroaryl group" refers to a group formed by removing one or more hydrogen atoms (as needed for the particular group and at least one of which is an aromatic ring carbon or heteroatom) from an heteroaromatic compound. Therefore, the one or more hydrogen atom can be removed from a ring carbon atom and/or from a heteroaromatic ring or ring system heteroatom. Thus, a "heteroaryl" group or moiety includes a "heteroarenediyl group" which arises by formally removing two hydrogen atoms from a heteroarene compound, at least one of which typically is from a heteroarene ring or ring system carbon atom. Thus, in a "heteroarenediyl group," at least one hydrogen is removed from a heteroarene ring or ring system carbon atom, and the other hydrogen atom can be removed from any other carbon atom, including for example, a heteroarene ring or ring system carbon atom, or a non-heteroarene ring or ring system atom.

An "amide" group or moiety refers to a group formed by removing one or more hydrogen atoms (as needed for the particular group) from an amide compound, including an organic amide compound. Therefore, the one or more hydrogen atom can be removed from a carboxyl group carbon, from an amide nitrogen, from any organic moiety bonded to either the carboxyl group carbon or the amide nitrogen, or from an organic moiety bonded to the carboxyl group carbon and an organic moiety bonded to the amide nitrogen. Often, for example, when an amide group links amines in a polyamine, the "amide" group or moiety arises from formally removing an hydrogen atom from each of two organic groups, one bonded to the carboxyl group and the other to the amide nitrogen. This term can be used for any amide moiety, whether the organic groups of the amide or aliphatic or aromatic.

The use of various substituted analogs or formal derivatives of any of these groups may also be disclosed, in which case the analog or formal derivative is not limited to the number of substituents or a particular regiochemistry, unless otherwise indicated. For example, the term "hydroxyalkyl" refers to a group formed by formally removing one or more hydrogen atoms (as needed for the particular group) from the alkyl portion of a hydroxy-substituted alkane. The hydroxy-substituted alkane can include one or more hydroxy substituents. Therefore, a "hydroxyalkyl" group includes, for example, a hydroxy-substituted "alkanediyl" group which is formed by formally removing two hydrogen atoms from a "hydroxyalkyl" alkane (either two hydrogen atoms from one carbon atom or one hydrogen atom from two different carbon atoms) when the context requires or allows, as long as the usual rules of chemical valence are applied. As indicated for an alkyl group, the alkyl group can be substituted or unsubstituted groups, can be acyclic or cyclic groups, and/or may be linear or branched unless otherwise specified.

The synthesis of standard PAE wet strength resin using adipic acid and DETA with epichlorohydrin is given in Scheme 1. The resin according to the present invention using new cross-liner, methylene bis-acrylamide (MBA) is given in Scheme 2.

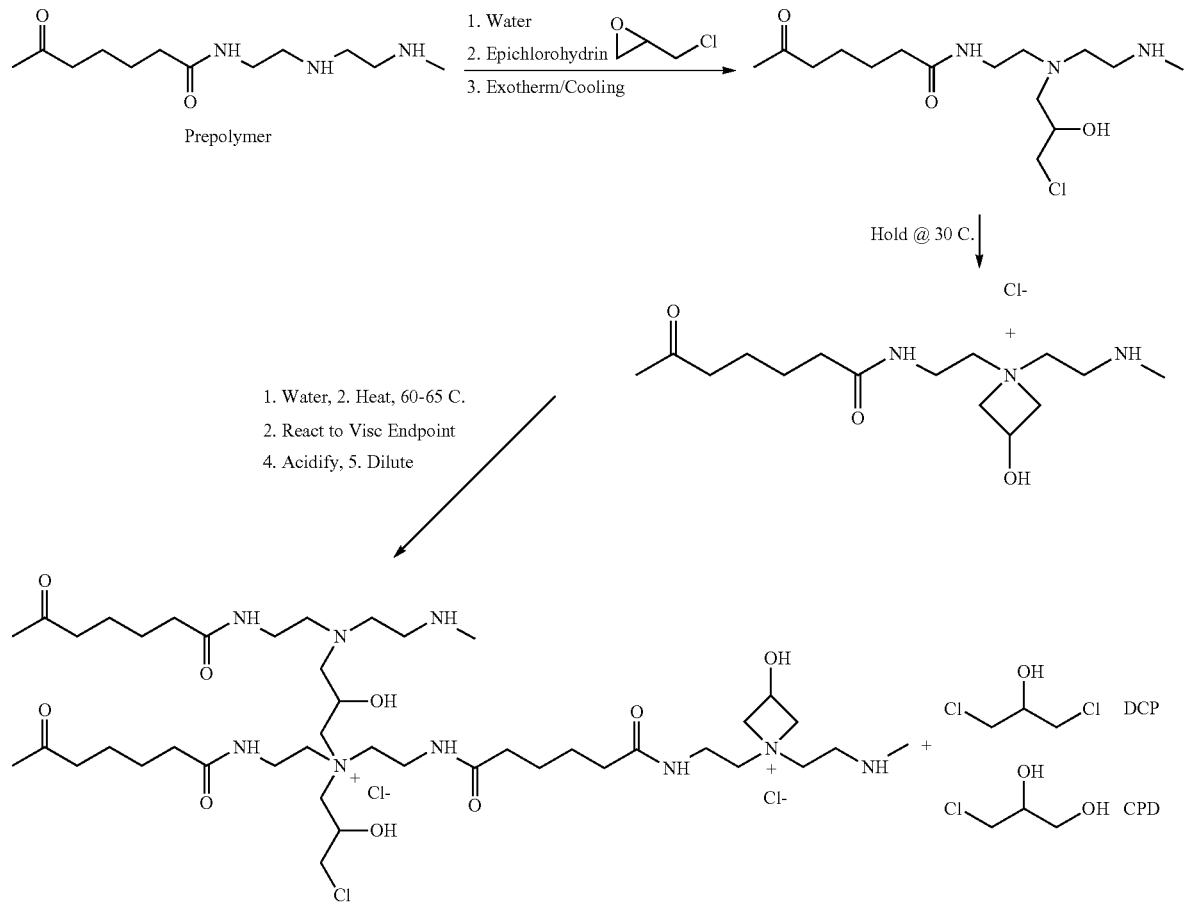

Scheme 1

Scheme 2

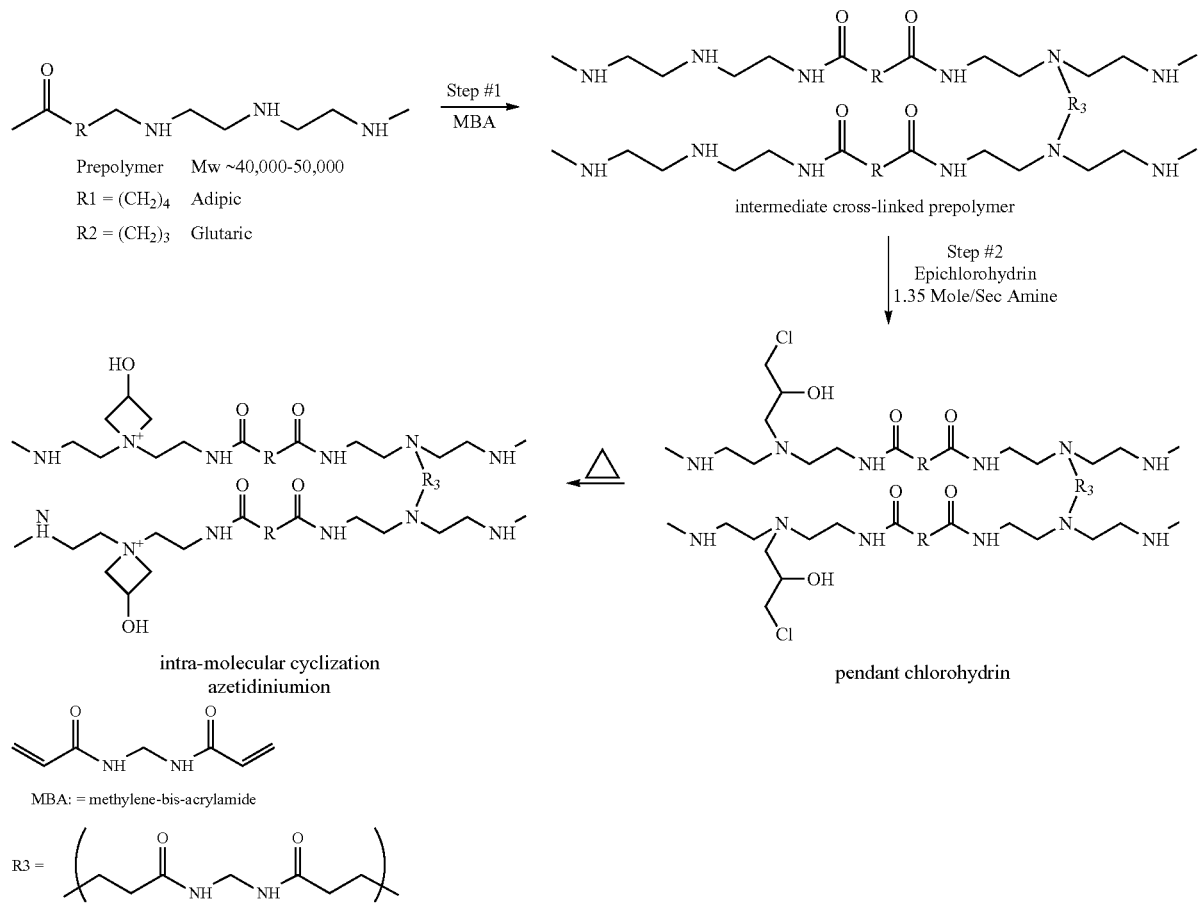

MBA: = methylene-bis-acrylamide

$^{13}$C NMR Determination of Azetidinium Ratio in Wet Strength Resins (Azet Ratio)

The azetidinium ratio, or "Azet" ratio, is the ratio of the polymer segments containing azetidinium ion to the total number of polymer segments. A single polymer segment is defined by a condensation moiety derived from one diacid molecule (for example, adipic acid) and one triamine molecule (for example, diethylenetriamine or DETA), illustrated below.

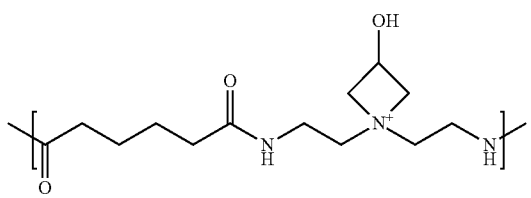

The azetidinium ion ratio is determined by quantitative (inverse gated heteronuclear decoupled)$^{13}$C NMR spectroscopy, using a relaxation time of 22.5 seconds, spectral width of 15000 Hz (240 ppm) and from 320 to 1024 scans. Measurements were made by integration of the methylene peaks in the azetidinium ion and the inner carbons of the adipic acid portion of the polymer. The adipic acid portion is assigned to be the total number of polymer segments. Thus when the polymer is prepared using adipic acid, the azetidinium ratio is determined according to the formula:

Azetidinium Ion Ratio (Azet Ratio)=$A$(azet)/$A$(adip), where, $A$(azet) is the integrated area of methylenes from azetidinium ions; and $A$(adip) is the integrated area of methylenes from adipic moiety (total polymer segments). This method can be adapted to any resin disclosed herein. Thus, for Adipic Acid based polymers the azetidinium ion peak at 74 ppm and the backbone methylene peak at 25 ppm were both integrated and the methylene peak at 25 ppm was normalized to 1. For glutaric Acid based polymers, the azetidinium ion peak at 74 ppm and the backbone methylene peak at 22 ppm were both integrated and the methylene peak at 22 ppm was normalized to 1.

Charge Density of Wet Strength Resins.

The charge density of cationic polyaminoamide-epichlorohydrin (PAE) wet strength resins with typical non-volatile content of about 10-50% was measured using a Mütek (Muetek) PCD-03 Particle Charge Detector and Titrator as follows. Charge density was determined by measuring the streaming current potential of a dilute solution of the polycationic resin by titration with a polyanionic solution of polyvinyl sulfate (PVSK). The non-volatile content of the PAE resin was predetermined, and the charge density in milliequivalents (+) per gram of solids (meq+/g) are reported.

Under the action of van der Waal forces, the polycationic resin is preferentially adsorbed at the surface of the test cell and its oscillating displacement piston, and as a diffuse cloud of counter-ions is sheared off the cationic colloids by the liquid flow in the test cell, a so-called streaming current is induced. Electrodes in the test cell wall measure this streaming current. The PAE resins are titration with PVSK until the PAE resin reaches the point of zero charge, and the original resin charge is calculated from the titrant consumption. The streaming current is used to calculate the milliequivalents of cationic charge per gram solid resin (meq+/gram) as follows:

$$\text{Charge Density} = \frac{PVSK(\text{mL}) * PVSK(\overline{N})}{GramActiveResin} = \frac{\text{meq}+}{\text{gram}}$$

Preparation of Sheets.

The pulp stock used in the handsheet work was unique for each study, as indicated in Tables 2, 3, and 4. The resins were added at the lb/ton of pulp solids indicated in the tables to the diluted stock consistency indicated in the respective tables (Thick Stock %), allowing a 2-minute mixing time. The treated stock was immediately poured into the headbox of the Noble & Wood handsheet machine containing pH pre-adjusted water (pH of 7.0). The target sheet basis weight was 30 lb/3000 ft². Each wet sheet was given two passes through the full load wet press, and then placed on the 105° C. drum dryer without the blotter for 1 minute. All sets of handsheets were further cured for 10 minutes at 105° C. in a forced air oven. The handsheet samples were continued at a constant humidity (50%) and at a constant temperature (73° F.) for 24 hours prior to testing.

Tensile Measurements.

Dry tensile and wet tensile (test specimens immersed in distilled water at 23.0±0.2° C.) were tested to measure improved paper dry and wet tensile strength performance. Dry and wet tensile are reported for wet and dry breaking length (Wet BL and Dry BL) in kM/m. Dry tensile measurement method refers to TAPPI Test Method T494 om-01 (Effective Date Sep. 5, 2001). Wet tensile measurement method refer to TAPPI Test Method T456 om-03 (Effective Date May 13, 2003).

% Wet/Dry Tensile (% W/D Tensile).

% Wet/Dry Tensile is measured as a percentage of wet to dry tensile, that is, % W/D BL (breaking length) is the (wet tensile breaking length)/(dry tensile breaking length)×100.

Wet and Dry Tear.

Dry tear measurement method refer to TAPPI Test Method T 414-om-04 (Effective date of Issue May 3, 2004). Wet tear measurement determined by TAPPI Test Method T 414-om-04 (Effective date of Issue May 3, 2004).

EXAMPLES

The following examples are provided to illustrate various embodiments of the disclosure and the claims. Unless otherwise specified, reagents were obtained from commercial sources. The following analytical methods were used to characterize the resins.

Example 1. Preparation of Polyamidoamine Prepolymer I

A glass reactor with a 5-neck top was equipped with a stainless steel stirring shaft, a reflux condenser, temperature probe, and a hot oil bath was provided. To the reactor was added 500.5 grams of DETA (diethylenetriamine). The stirrer was turned on and 730 grams of adipic acid was added slowly to the reactor over 45 minutes with stirring. The reaction temperature increased from 25° C. to 145° C. during adipic acid addition. After the adipic acid addition was complete, the reactor was immersed in a hot oil bath heated to 160° C. At 150° C. the reaction mixture began to reflux. The reflux condenser was reconfigured for distillation, and distillate was collected in a separate receiver. The reaction mixture was sampled at 30 minute intervals. Each sample was diluted to 45% solids with water, and the viscosity was measured with Brookfield viscometer. When the sample reached 290 cP the distillation condenser was reconfigured to reflux. Water was added slowly to the reaction mixture through the reflux condenser to dilute and cool the reaction. Water was added to obtain a final solids of 45%. The viscosity was 290 cP.

Example 2. Preparation of Polyamidoamine Prepolymer II

A glass reactor with a 5-neck top was equipped with a stainless steel stirring shaft, a reflux condenser, temperature probe, and a hot oil bath was provided. To the reactor was added 1574.5 grams DBE-5 (glutaric acid dimethyl ester, or dibasic ester). The stirrer was turned on and 1038.9 grams of DETA was added to the reactor with stirring. The reactor was immersed in a hot oil bath heated to 100° C. At 90° C. the reaction mixture began to reflux. The reflux condenser was reconfigured for distillation and distillate was collected in a separate receiver. The reaction mixture was sampled at 30 minute intervals. Each sample was diluted to 45% solids with water, and the viscosity was measured with Brookfield viscometer. When the sample reached 220 cP the distillation condenser was reconfigured to reflux. Water was added slowly to the reaction mixture through the reflux condenser to dilute and cool the reaction. Water was added to obtain a final solids of 45%. The viscosity was 220 cP.

Example 3. Preparation of a Wet Strength Resin

Step 1.

A glass reactor with 5-neck top was equipped with a glass stirring shaft and Teflon paddle, an equal pressure addition funnel, temperature and pH probe, stainless steel cooling coils, sample valve, and heating mantle. To the reactor was added 445.64 grams of Polyamidoamine Prepolymer II from Example 2. Water, 5.25 grams was added and the stirrer was started. The reaction mixture was heated to 35° C. and 2.028 grams of N, N-methylene-bis-acrylamide (Pfaltz & Bauer, Inc.) was added. The reaction mixture was heated to 60° C. and held at that temperature for 4 hours. The viscosity of the reaction mixture advanced to 384 cP (Brookfield-SSA). The intermediate (partially cross-linked) prepolymer mixture was utilized in-situ in the following Step 2.

Step 2.

The reaction temperature of the intermediate prepolymer mixture from Step 1 was adjusted to 25° C., and 88.46 grams of water was added. The reaction temperature was then adjusted to 21° C. and 121.21 grams of epichlorohydrin was added over 75 minutes. This reaction mixture was allowed to warm to 25° C. over 45 minutes and 446.27 grams of water was added. This reaction mixture was heated to 45° C., and after 2 hours was heated to 55° C. After about 4 hours, a mixture of formic acid and sulfuric acid was added to adjust the pH to 2.87. (Generally, the pH can be adjusted using any organic acid, mineral acid, or combination thereof, for example, acetic acid, formic acid, hydrochloric acid, phosphoric acid, sulfuric acid, or any combination thereof.) The reaction mixture then was cooled to 25° C., and water was added to adjust the solids to 25.0%. The viscosity of the resultant wet strength resin was 187 cP.

Example 4. Preparation of a Wet Strength Resin

Step 1.

A glass reactor with 5-neck top was equipped with a glass stirring shaft and Teflon paddle, an equal pressure addition funnel, temperature and pH probe, stainless steel cooling coils, sample valve, and heating mantle. To the reactor was added 1000.00 grams of Polyamidoamine Prepolymer I from Example 1. The stirrer was started and the prepolymer was heated to 40° C. N, N-Methylene-bis-acrylamide, 15.16 grams (Pfaltz & Bauer, Inc), was added slowly while the reaction mixture was heated to 60° C. The reaction mixture then was held at 60° C. for about 2 hours, and the viscosity advanced to 4,630 cP (Brookfield-SSA), at which point the viscosity advancement stopped. The reaction was cooled to 25° C. The intermediate (partially cross-linked) prepolymer was isolated and stored.

Step 2.

To the reactor configured as described in Step 1 was added 366.04 grams of intermediate (partially cross-linked) prepolymer from Step 1 above. The reaction temperature was adjusted to 25° C. and 120.13 grams of water was added. The viscosity of the reaction mixture was 837 cP. To the intermediate partially cross-linked prepolymer was added 77.89 grams of epichlorohydrin at 25° C. over 90 minutes. 428.19 Grams of water was added to the reaction mixture. The reaction was held at 25° C. for 18 hours while sampling periodically for $^{13}C$ NMR analysis. During this time the viscosity of the reaction increased from 18 cP to 319 cP (Brookfield-SSA). This reaction was treated with concentrated sulfuric acid to adjust the pH to 2.94. The reaction mixture was adjusted to 25.0% solids, and the viscosity was 335 cP.

Example 5. Preparation of a Wet Strength Resin

Step 1.

A glass reactor with 5-neck top was equipped with a glass stirring shaft and Teflon paddle, an equal pressure addition funnel, temperature and pH probe, stainless steel cooling coils, sample valve, and heating mantle. To the reactor was added 449.10 grams of Polyamidoamine Prepolymer II from Example 2. The stirrer was started, the reaction mixture was heated to 30° C., and 6.92 grams of poly(propylene glycol) diglycidyl ether (Polystar) was added over 1 hour. The reaction mixture held at 30° C. for 1 hour and was then heated to 60° C., at which point the viscosity was 416 cP. The reaction mixture was heated at 60° C. for about 4 hours, and the viscosity advanced to 542 cP (Brookfield-SSA). The intermediate cross-linked prepolymer was utilized in-situ in Step 2 that follows.

Step 2.

The reaction temperature of the intermediate prepolymer mixture from Step 1 was adjusted to 25° C., and 80.10 grams of water was added. To the reactor was added 118.79 grams of epichlorohydrin over 75 minutes. The reaction was allowed to warm to 30° C. over 45 minutes, and 431.35 grams of water was added. The reaction was warmed to 45° C. over 45 minutes and after 2 hours was heated to 50° C. After about 3.5 hours the viscosity of the reaction was about 320 cP (Gardner-Holdt bubble tube), and then a mixture of formic acid and sulfuric acid was added to adjust the pH to 3.00. The reaction mixture was cooled to 25° C. and water was added to adjust the solids to 25.0%. The viscosity of the resultant wet strength resin was 219 cP.

Example 6. Preparation of Handsheets

A comparison of wet strength resin performance with standard commercially available wet strength resins is provided in the examples and data tables. Each data table indicates the stock used in the comparisons and the stock freeness (CSF) is reported. The resins were added at the rate shown (lb resin/ton of pulp solids) to a thick stock allowing a 2-minute mixing time. The treated stock was immediately poured into the headbox of the Noble & Wood handsheet machine containing pH pre-adjusted water.

The target sheet basis weight is indicated in each set of data in lb/ft$^2$. Each wet sheet was given two passes through the full load wet press, and then placed on the drum dryer at 105° C. without the blotter for 1 minute. All sets of handsheets were further cured for 10 minutes at 105° C. in a forced air oven. The handsheet samples were continued at a constant humidity (50%) and at a constant temperature (73° F.) for 24 hours prior to testing. Any additional conditions are reported in the Tables. The handsheet samples were continued at a constant humidity (50%) and at a constant temperature (73° F.) for 24 hours prior to testing.

The composition resins were added at the rate (lb/ton) of pulp solids as indicated with each data table to thick stock (see Tables) allowing a 2-minute mixing time. The treated stock was immediately poured into the headbox of the Noble & Wood handsheet machine containing pH pre-adjusted water (pH of 7.0). The target sheet basis weight is indicated in each Table. Each wet sheet was given two passes through the full load wet press, and then placed on the 105° C. drum dryer without the blotter for 1 minute. All sets of handsheets were further cured for 3 minutes at 105° C. in a forced air oven. The handsheet samples were continued at a constant humidity (50%) and at a constant temperature (73° F.) for 24 hours prior to testing.

Example 7. Evaluation of Composition Properties and Performance

A comparison of wet strength resin properties with standard commercially available wet strength resins is provided in the following tables. The wet strength resin properties of the resin prepared according to this disclosure were examined and compared to standard commercially available wet strength resin products, including the AMRES® series (Georgia-Pacific) of resins and the KYMENE® (Ashland) resins. Both properties of the resins themselves and the performance of the resins for imparting wet strength are compared in the following tables.

Table 1 illustrates that the wet strength resins prepared according to this disclosure show significant improvement in properties as compared to commercially available resins. For example, at comparable solids content, the Example 3 resin has significantly higher charge density, proportion of azetidinium ions to amide residues, molecular weight, azetidinium equivalent weight, and other properties as compared to conventional resins. Moreover the undesired 1,3-dichloro2-propanol (1,3-DCP) content in the resulting resin is substantially reduced.

TABLE 1

Properties of wet strength resin compared to commercially available resins [A]

| Product | Solids | Charge | Azet Ratio | Mw | Azet Eq Wt | DCP @ 25% |
|---|---|---|---|---|---|---|
| Example 3 | 25 | 2.80 | 0.80 | 1.00E6 | 2,690 | 9,800 |
| Resin 1 | 25 | 2.00 | 0.67 | 8.00E5 | 1,753 | 17,000 |
| Resin 2 | 25 | 1.94 | 0.66 | 8.00E5 | 1,727 | 15,500 |
| Resin 3 | 25 | 1.35 | 0.66 | 8.00E5 | 1,727 | 11,050 |
| Resin 4 | 21 | 1.94 | 0.65 | 5.75E5 | 1,222 | 9,200 |
| Resin 5 | 12.5 | 1.85 | 0.62 | 6.00E5 | 1,217 | 15,800 |

[A] Abbreviations are as follows:
Solids is the total solids or non-volatiles in the resin material, including polymer and any additives.
Charge is the charge density in milliequivalents per gram of solids (meq/g), measured with a titration test using a Muetek tritration test.
Azet is the ratio of azetidinium ions to amide residues in the wet strength resin as measured by quantitative $^{13}$C NMR spectroscopy.
Mw is the weight average molecular weight.
Azet Eq Wt is the degree of polymerization multiplied by the Azet ratio, or (degree of polymerization) × (Azet).
DCP @ 25% is the concentration of epichlorohydrin hydrolysis by product 1,3-dichloropropanol (DCP) remaining in the resin at 25% solids.

Table 2 illustrates the improvements in wet breaking length of premium grade heavyweight towel when treated with the resins according to this disclosure. Comparisons of the same properties obtained using conventional resins are provided, with data measured at different application rates. Substantial improvements in properties are observed using resins prepared as in this disclosure.

TABLE 2

Performance properties of wet strength resin compared to commercially available resins at different application rates [A]

| | Wet BL | | % W/D BL | |
|---|---|---|---|---|
| Product | 8 lb/ton | 16 lb/ton | 8 lb/ton | 16 lb/ton |
| Example 3 | 1.68 | 2.30 | 25.79 | 35.22 |
| Resin 1 | 1.46 | 2.14 | 21.76 | 32.11 |
| Resin 2 | 1.33 | 1.96 | 19.90 | 29.38 |

[A] Conditions: Premium Grade (Bleached Virgin) Heavyweight Towel, Noble & Wood Sheetformer, target sheet basis weight 28 lb/3000 sq ft, BSWK, pH 7.54, Thick Stock 2.31%, stock freeness 584 CSF, CMC 2 lb/ton, Cure for 5 min/105° C.

Table 3 likewise illustrates the improvements in wet breaking length of recycled heavyweight towel when treated with the resins according to this disclosure at different application rates (5, 10, and 15 lb composition resin per ton of pulp solids). Comparisons of the same properties obtained using conventional resins are provided. In every case, the substantial improvement in performance using the disclosed wet strength resins is illustrated.

TABLE 3

Performance properties of wet strength resin compared to commercially available resins at different application rates. [A]

| | Wet BL | | |
|---|---|---|---|
| Product | 5 lb/ton | 10 lb/ton | 15 lb/ton |
| Example #3 | 1.98 | 2.40 | 2.56 |
| Resin 1 | 1.72 | 2.02 | 2.21 |
| Resin 2 | 1.76 | 2.01 | 2.26 |
| Resin 6 | 1.65 | 1.74 | 1.93 |

[A] Conditions: 100% Recycled Heavyweight Towel; Noble & Wood Sheetformer, 28 lb/3000 sq ft; pH 7.5; Thick Stock 1.50%, 475 CSF, Dryers 230° F., Cure for 5 min/105° C.

Similarly, Table 4 illustrates the improvements in wet tensile in breaking length of unbleached SW kraft at different application rates (4, 6, and 8 lb composition resin per ton of pulp solids) and the % wet/dry tensile as compared to more conventional resin materials. In each case, improvement in performance using the disclosed wet strength resins was observed. The wet tear was also reported and measured using the designated resins, and again, at every application rate the improvement in performance using the disclosed wet strength resins is illustrated.

TABLE 4

Performance properties of wet strength resin compared to commercially available resins at different application rates. [A]

| | % Wet/Dry Tensile | | | Wet Tear | | |
|---|---|---|---|---|---|---|
| Product | 4 lb/ton | 6 lb/ton | 8 lb/ton | 4 lb/ton | 6 lb/ton | 8 lb/ton |
| Example #3 | 44.22 | 64.71 | 80.52 | 95.33 | 143.46 | 170.49 |
| Amres ® 1110-E | 43.14 | 58.11 | 73.11 | 88.84 | 120.80 | 154.24 |
| Amres ® 652 | 37.93 | 48.99 | 62.23 | 77.45 | 103.04 | 133.06 |

[A] Conditions: 100% Unbleached SW Kraft, Noble & Wood Sheetformer, 83 lb/3000 sq ft; pH = 6.97, Thick Stock 2.51%, 714 CSF, 13 lb/ton alum, 4 passes on dryer 230° F., 5 min/105° C. cure.

Embodiments of the present disclosure further relate to any one or more of the following paragraphs:

1. A process for preparing a resin, comprising:

a) reacting a polyamine with a symmetric cross-linker to produce a partially cross-linked polyamine;

b) adding a epihalohydrin to the partially cross-linked polyamine to produce a halohydrin-functionalized polymer; and c) cyclizing the halohydrin-functionalized polymer to form the resin having azetidinium moieties.

2. The process according to paragraph 1, wherein the polyamine has the structure

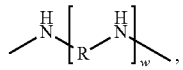

wherein R is alkyl, hydroxyalkyl, amine, amide, aryl, heteroaryl or cycloalkyl and w is an integer from 1 to about 10,000.

3. The process according to paragraph 1, wherein the polyamine has molecular weight of about 2,000 to about 1,000,000.

4. The process according to paragraph 3, wherein the polyamine has molecular weight of about 10,000 to about 200,000.

5. The process according to paragraph 1, wherein the symmetric cross-linker is selected from a di-acrylate, a bis(acrylamide), a di-epoxide and polyazetidinium compounds.

6. The process according to paragraph 1, wherein the symmetric cross-linker is selected from:

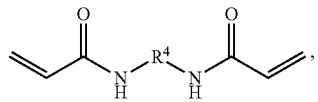

wherein $R^4$ is $(CH_2)_t$, and wherein t is 1, 2, or 3;

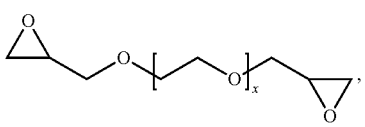

wherein x is from 1 to about 100;

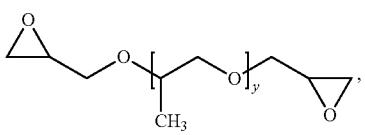

wherein y is from 1 to about 100;

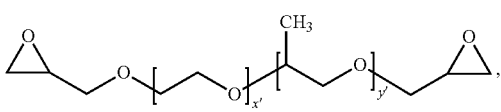

wherein x'+y' is from 1 to about 100;

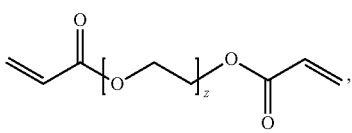

wherein z is from 1 to about 100;

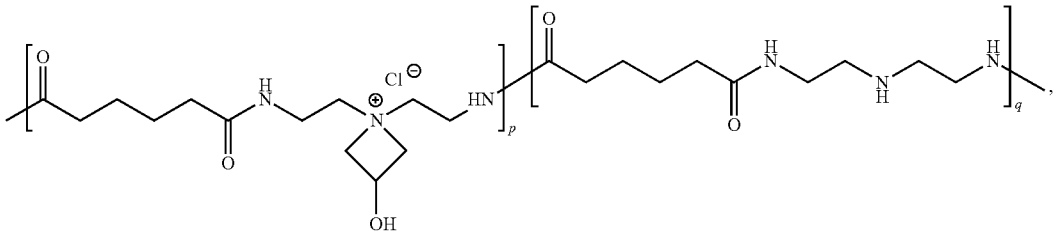

wherein a q/p ratio is from about 10 to about 1000;
a copolymer of an acrylate monomer, a methacrylate monomer, an alkene monomer, or a diene monomer, with an azetidinium-functionalized monomer selected from

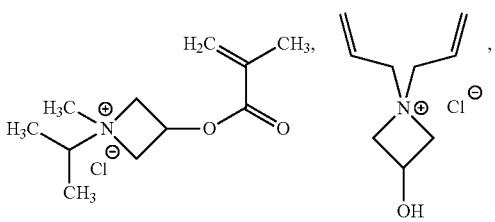

and a combination thereof, wherein a fraction of the azetidinium-functionalized monomer to the acrylate monomer, the methacrylate monomer, the alkene monomer, or the diene monomer in the copolymer is from about 0.1% to about 12%; and
any combination thereof.

7. The process according to paragraph 1, wherein the symmetric cross-linker is selected from N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds and any combination thereof.

8. The process according to paragraph 1, wherein the epihalohydrin is selected from epichlorohydrin, epibromohydrin, and epiiodohydrin.

9. The process according to paragraph 8, wherein the epihalohydrin is epichlorohydrin.

10. The process according to paragraph 1, further comprising:
reacting the polyamine with a mono-functional modifier prior to, during, or after treating with the symmetric cross-linker.

11. The process according to paragraph 10, wherein the mono-functional modifier is selected from a neutral or cationic acrylate compound, a neutral or cationic acrylamide compound, an acrylonitrile compound, a mono-epoxide compound, or a combination thereof.

12. The process according to paragraph 10, wherein the mono-functional modifier is selected from an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, and any combination thereof.

13. The process according to paragraph 10, wherein the mono-functional modifier comprises at least one of: methyl acrylate, alkyl acrylate, acrylamide, N-methylacrylamide, N,N-dimethylacrylamide, acrylonitrile, 2-methyloxirane, 2-ethyloxirane, 2-propyloxirane, 2-(allyloxymethyl)oxirane, 2-hydroxyethyl acrylate, 2-(2-hydroxyethoxy)ethyl acrylate, 2-(acryloyloxy)-N,N,N-trimethylethanaminium, 3-(acryloyloxy)-N,N,N-trimethylpropan-1-aminium, 2-acrylamido-N,N,N-trimethylethanaminium, 3-acrylamido-N,N,N-trimethylpropan-1-aminium, and 1-isopropyl-3-(methacryloyloxy)-1-methylazetidinium chloride.

14. The process according to paragraph 1, wherein the ratio of azetidinium ions to secondary amine moieties in the resin is from about 0.4 to about 1.0.

15. The process according to paragraph 1, wherein the concentration of 1,3-dichloro-2-propanol (1,3-DCP) is less than about 15,000 ppm.

16. The process according to paragraph 1, wherein a pH of the resin is adjusted using an acid.

17. The process according to paragraph 16, wherein the acid is acetic acid, formic acid, hydrochloric acid, phosphoric acid, sulfuric acid, organic acid or mineral acid or a combination thereof.

18. The process according to paragraph 16, wherein the pH of the resin is adjusted to about pH 2.0 to about pH 4.5.

19. The process according to paragraph 1, wherein the solids content of the resin is adjusted from about 10% to about 50%.

20. The process according to paragraph 1, wherein the resin has a charge density of about 1.0 to about 4.0 mEq/g of solids.

21. The process according to paragraph 1, wherein the resin has a ratio of azetidinium ions to amide residues is from about 0.5 to about 0.9.

22. The process according to paragraph 1, wherein the resin has a molecular weight from about $0.02 \times 10^6$ to about $3.0 \times 10^6$.

23. The process according to paragraph 1, wherein the resin has an azetidinium equivalent weight from about 1,800 to about 3,500.

24. The process according to paragraph 1, wherein the resin has 1,3-dichloro-2-propanol (1,3-DCP) content less than about 10,000 ppm.

25. A composition comprising a resin, wherein the resin is prepared by a process comprising:
   a) reacting a polyamine with a symmetric cross-linker to produce a partially cross-linked polyamine;
   b) adding a epihalohydrin to the partially cross-linked polyamine to produce a halohydrin-functionalized polymer; and
   c) cyclizing the halohydrin-functionalized polymer to form the resin having azetidinium moieties.

26. The composition according to paragraph 25, wherein the polyamine has the structure

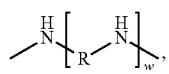

wherein R is alkyl, hydroxyalkyl, amine, amide, aryl, heteroaryl or cycloalkyl and w is an integer from 1 to about 10,000.

27. The composition according to paragraph 25, wherein the polyamine has molecular weight of about 2,000 to about 1,000,000.

28. The composition according to paragraph 27, wherein the polyamine has molecular weight of about 10,000 to about 200,000.

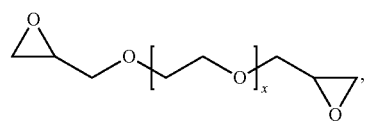

wherein x is from 1 to about 100;

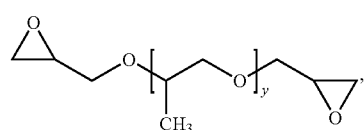

wherein y is from 1 to about 100;

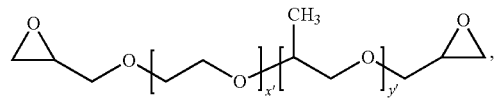

wherein x'+y' is from 1 to about 100;

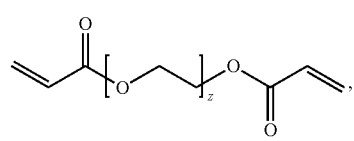

wherein z is from 1 to about 100;

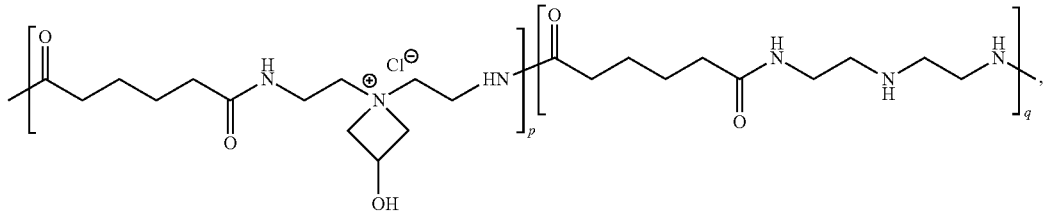

29. The composition according to paragraph 25, wherein the symmetric cross-linker is selected from a di-acrylate, a bis(acrylamide), a di-epoxide and polyazetidinium compounds.

30. The composition according to paragraph 25, wherein the symmetric cross-linker is selected from:

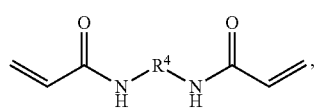

wherein $R^4$ is $(CH_2)_t$, wherein t is 1, 2, or 3;

wherein a q/p ratio is from about 10 to about 1000;
a copolymer of an acrylate monomer, a methacrylate monomer, an alkene monomer, or a diene monomer, with an azetidinium-functionalized monomer selected from

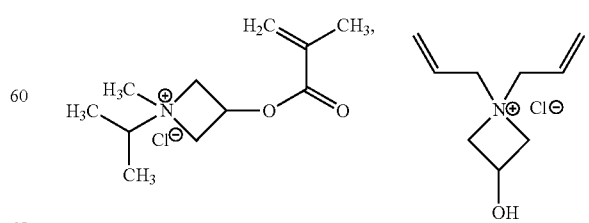

and a combination thereof, wherein the fraction of azetidinium-functionalized monomer to the acrylate monomer, the methacrylate monomer, the alkene monomer, or the diene monomer in the copolymer is from about 0.1% to about 12%; and any combination thereof.

31. The composition according to paragraph 25, wherein the symmetric cross-linker is selected from N,N'-methylene-bis-acrylamide, N,N'-methylene-bis-methacrylamide, poly(ethylene glycol) diglycidyl ether, poly(propylene glycol) diglycidyl ether, polyethylene glycol diacrylate, polyazetidinium compounds and any combination thereof.

32. The composition according to paragraph 25, wherein the epihalohydrin is selected from epichlorohydrin, epibromohydrin, and epiiodohydrin.

33. The composition according to paragraph 32, wherein the epihalohydrin is epichlorohydrin.

34. The composition according to paragraph 25, wherein the process further comprises:

reacting the polyamine with a mono-functional modifier prior to, during, or after treating with the symmetric cross-linker.

35. The composition according to paragraph 34, wherein the mono-functional modifier is selected from a neutral or cationic acrylate compound, a neutral or cationic acrylamide compound, an acrylonitrile compound, a mono-epoxide compound, or a combination thereof.

36. The composition according to paragraph 34, wherein the mono-functional modifier is selected from an alkyl acrylate, acrylamide, an alkyl acrylamide, a dialkyl acrylamide, acrylonitrile, a 2-alkyl oxirane, a 2-(allyloxyalkyl) oxirane, a hydroxyalkyl acrylate, an ω-(acryloyloxy)-alkyltrimethylammonium compound, an ω-(acrylamido)-alkyltrimethylammonium compound, and any combination thereof.

37. The composition according to paragraph 34, wherein the mono-functional modifier comprises at least one of: methyl acrylate, alkyl acrylate, acrylamide, N-methylacrylamide, N,N-dimethylacrylamide, acrylonitrile, 2-methyloxirane; 2-ethyloxirane, 2-propyloxirane, 2-(allyloxymethyl) oxirane, 2-hydroxyethyl acrylate, 2-(2-hydroxyethoxy)ethyl acrylate, 2-(acryloyloxy)-N,N,N-trimethylethanaminium, 3-(acryloyloxy)-N,N,N-trimethylpropan-1-aminium; 2-acrylamido-N,N,N-trimethylethanaminium, 3-acrylamido-N,N,N-trimethylpropan-1-aminium, and 1-isopropyl-3-(methacryloyloxy)-1-methylazetidinium chloride.

38. The composition according to paragraph 25, wherein the ratio of azetidinium ions to secondary amine moieties in the resin is from about 0.4 to about 1.0.

39. The composition according to paragraph 25, wherein the concentration of 1,3-dichloro-2-propanol (1,3-DCP) is less than about 15,000 ppm.

40. The composition according to paragraph 25, wherein a pH of the resin is adjusted using an acid.

41. The composition according to paragraph 40, wherein the acid is acetic acid, formic acid, hydrochloric acid, phosphoric acid, sulfuric acid, organic or mineral acid or a combination thereof.

42. The composition according to paragraph 40, wherein the pH of the resin is adjusted to about pH 2.0 to about pH 4.5.

43. The composition according to paragraph 25, wherein the solids content of the resin is adjusted from about 10% to about 50%.

44. The composition according to paragraph 25, wherein the resin has a charge density of about 1.0 to about 4.0 mEq/g of solids.

45. A composition having at least three of the following characteristics:

a) a charge density of about 1.0 to about 4.0 mEq/g of solids;

b) a ratio of azetidinium ions to amide residues in the resin is from about 0.5 to about 0.9;

c) a molecular weight from about $0.1 \times 10^6$ to about $3.0 \times 10^6$;

d) an azetidinium equivalent weight from about 1,800 to about 3,500; and e) a 1,3-dichloro-2-propanol (1,3-DCP) content of less than about 10,000 ppm when the solids content is about 25%.

46. A paper strengthened with the composition of any one of paragraphs 25-45.

47. A process of treating paper to impart wet strength, the process comprising treating pulp fibers used to make a paper with a resin composition made by:

a) reacting a polyamine with a symmetric cross-linker to produce a partially cross-linked polyamine;

b) adding a epihalohydrin to the partially cross-linked polyamine to produce a halohydrin-functionalized polymer; and c) cyclizing the halohydrin-functionalized polymer to form the resin having azetidinium moieties.

What is claimed is:

1. A strengthening resin comprising two polyamidoamines that are crosslinked with a bridging moiety, wherein the two polyamidoamines that are crosslinked with the bridging moiety have azetidinium ions and amide residues, and a ratio of the azetidinium ions to the amide residues is at least 0.7 to 1, wherein the azetidinium ions are formed by reacting an epihalohydrin and the two polyamidoamines that are crosslinked with the bridging moiety, and wherein the bridging moiety is derived from a functionally symmetric cross-linker that is selected from the group consisting of:

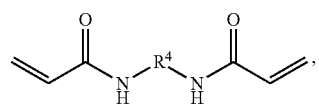

wherein $R^4$ is $(CH_2)_t$, wherein t is 1, 2, or 3;

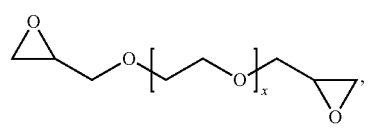

wherein x is from 1 to about 100;

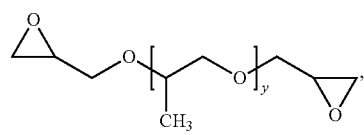

wherein y is from 1 to about 100;

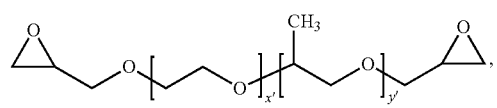

wherein x'+y' is from 1 to about 100;

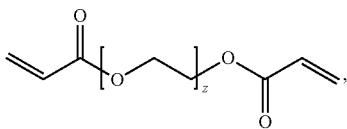

wherein z is from 1 to about 100;

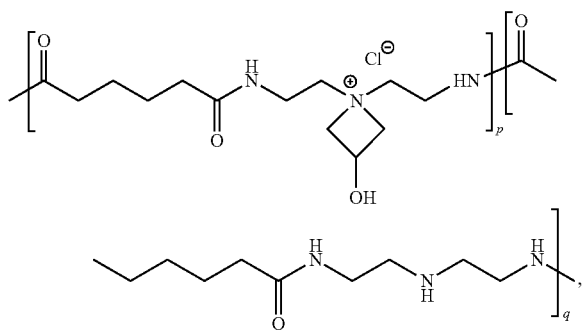

wherein a q/p ratio is from about 10 to about 1000;
a copolymer of an acrylate monomer, a methacrylate monomer, an alkene monomer, or a diene monomer, with an azetidinium-functionalized monomer selected from the group consisting of:

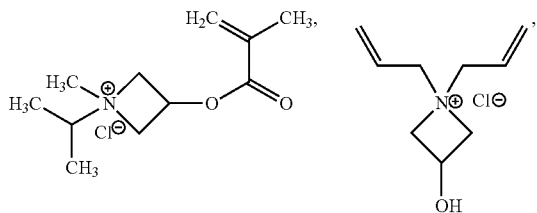

and a combination thereof, wherein the fraction of azetidinium-functionalized monomer to the acrylate monomer, the methacrylate monomer, the alkene monomer, or the diene monomer in the copolymer is from about 0.1% to about 12%; and
a combination thereof, wherein the strengthening resin contains less than 15,000 ppm of 1,3-dichloro-2-propanol.

2. The strengthening resin of claim 1, wherein the two polyamidoamines crosslinked with the bridging moiety has an azetidinium equivalent weight of 2,000 to about 3,800.

3. The strengthening resin of claim 1, wherein the two polyamidoamines crosslinked with the bridging moiety has a weight average molecular weight of 900,000 to about 1,700,000.

4. The strengthening resin of claim 1, wherein the strengthening resin contains less than 10,000 ppm of 1,3-dichloro-2-propanol.

5. The strengthening resin of claim 1, wherein the two polyamidoamines crosslinked with the bridging moiety has an azetidinium equivalent weight of 2,000 to about 3,500 and a weight average molecular weight of 900,000 to about 1,700,000, and wherein the strengthening resin contains less than 10,000 ppm of 1,3-dichloro-2-propanol.

6. The strengthening resin of claim 1, wherein the two polyamidoamines crosslinked with the bridging moiety has a charge density of about 2.5 mEq/g of solids to about 4 mEq/g of solids.

7. A strengthening resin comprising two polyamidoamines that are crosslinked with a bridging moiety, wherein the two polyamidoamines that are crosslinked with the bridging moiety have azetidinium ions and amide residues, and a ratio of the azetidinium ions to the amide residues is at least 0.7 to 1, wherein the azetidinium ions are formed by reacting an epihalohydrin and the two polyamidoamines crosslinked with the bridging moiety, and wherein the bridging moiety is derived from a functionally symmetric cross-linker comprising a di-acrylate compound, a bis(acrylamide) compound, a di-epoxide compound, a polyazetidinium compound, N,N'-methylene-bis-methacrylamide, or any combination thereof, wherein the strengthening resin contains less than 15,000 ppm of 1,3-dichloro-2-propanol.

8. The strengthening resin of claim 7, wherein the functionally symmetric cross-linker comprises the di-acrylate compound.

9. The strengthening resin of claim 7, wherein the functionally symmetric cross-linker comprises the bis(acrylamide) compound.

10. The strengthening resin of claim 7, wherein the functionally symmetric cross-linker comprises the di-epoxide compound.

11. The strengthening resin of claim 7, wherein the functionally symmetric cross-linker comprises the N,N'-methylene-bis-methacrylamide.

12. The strengthening resin of claim 7, wherein the di-epoxide compound comprises a poly(alkylene glycol) diglycidyl ether.

13. The strengthening resin of claim 7, wherein the two polyamidoamines crosslinked with the bridging moiety has an azetidinium equivalent weight of 2,000 to about 3,800.

14. The strengthening resin of claim 7, wherein the two polyamidoamines crosslinked with the bridging moiety has a weight average molecular weight of 900,000 to about 1,700,000.

15. The strengthening resin of claim 7, wherein the strengthening resin contains less than 10,000 ppm of 1,3-dichloro-2-propanol.

16. The strengthening resin of claim 7, wherein the two polyamidoamines crosslinked with the bridging moiety has an azetidinium equivalent weight of 2,000 to about 3,500 and a weight average molecular weight of 900,000 to about 1,700,000, and wherein the strengthening resin contains less than 10,000 ppm of 1,3-dichloro-2-propanol.

17. The strengthening resin of claim 7, wherein the two polyamidoamines crosslinked with the bridging moiety has a charge density of about 2.5 mEq/g of solids to about 4 mEq/g of solids.

18. A strengthening resin, comprising two polyamidoamines crosslinked with a bridging moiety, wherein the two polyamidoamines that are crosslinked with the bridging moiety have azetidinium ions and amide residues, wherein a ratio of the azetidinium ions to the amide residues is at least 0.7 to 1, and wherein the two polyamidoamines crosslinked with the bridging moiety has an azetidinium equivalent weight of 2,000 to about 3,500 and a weight average molecular weight of 900,000 to about 1,700,000, wherein the bridging moiety is derived from a functionally symmetric cross-linker comprising a di-acrylate compound, a bis(acrylamide) compound, a di-epoxide compound, a polyazetidinium compound, N,N'-methylene-bis-methacrylamide, or any combination thereof, wherein the azetidinium ions are formed by reacting epichlorohydrin and the two polyamidoamines crosslinked with the bridging moiety, and wherein the strengthening resin contains less than 10,000 ppm of 1,3-dichloro-2-propanol.

19. The strengthening resin of claim 18, wherein the functionally symmetric cross-linker comprises the di-acrylate compound, the bis(acrylamide) compound, the di-epoxide compound, N,N'-methylene-bis-methacrylamide, or any combination thereof.

20. The strengthening resin of claim 18, wherein the diepoxide compound comprises a poly(alkylene glycol) diglycidyl ether.

* * * * *